United States Patent
Leise

(10) Patent No.: US 9,990,677 B1
(45) Date of Patent: Jun. 5, 2018

(54) SYSTEM, METHOD, AND COMPUTER-READABLE MEDIUM FOR FACILITATING TREATMENT OF A VEHICLE DAMAGED IN A CRASH

(71) Applicant: STATE FARM MUTUAL AUTOMOBILE INSURANCE COMPANY, Bloomington, IL (US)

(72) Inventor: William J. Leise, Normal, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 159 days.

(21) Appl. No.: 14/732,326

(22) Filed: Jun. 5, 2015

Related U.S. Application Data

(60) Provisional application No. 62/023,711, filed on Jul. 11, 2014.

(51) Int. Cl.
| | | |
|---|---|---|
| *G06Q 40/00* | (2012.01) | |
| *G06Q 40/08* | (2012.01) | |
| *G07C 5/00* | (2006.01) | |
| *G06Q 30/02* | (2012.01) | |
| *G06Q 10/00* | (2012.01) | |

(52) U.S. Cl.
CPC ............ *G06Q 40/08* (2013.01); *G06Q 10/20* (2013.01); *G06Q 30/0206* (2013.01); *G07C 5/008* (2013.01)

(58) Field of Classification Search
CPC .................................................... G06Q 40/08
See application file for complete search history.

(56) References Cited

U.S. PATENT DOCUMENTS

| | | | | |
|---|---|---|---|---|
| 5,950,169 A | * | 9/1999 | Borghesi | G06Q 30/0283 705/4 |
| 6,859,009 B2 | * | 2/2005 | Jablin | B60L 3/12 180/65.1 |
| 7,596,512 B1 | * | 9/2009 | Raines | G06Q 30/02 705/26.4 |
| 7,716,076 B1 | * | 5/2010 | Block | G06Q 40/08 705/4 |
| 7,860,764 B1 | * | 12/2010 | Alexander | G06Q 20/102 705/35 |

(Continued)

OTHER PUBLICATIONS

Non-Final Office Action for U.S. Appl. No. 14/732,331 dated Dec. 4, 2015.

(Continued)

*Primary Examiner* — Eric T Wong
(74) *Attorney, Agent, or Firm* — Marshall, Gerstein & Borun LLP; Randall G. Rueth

(57) ABSTRACT

A system, method, and computer-readable medium for facilitating treatment of a vehicle damaged in a crash utilizes near real-time monitoring of the market value of a vehicle type that includes the damaged vehicle, its vehicle parts, and/or one or more arranged vehicle treatments to approximate an extent of damage to the damaged vehicle and determine a prospective vehicle treatment facility for treating the damaged vehicle. In particular, the system continually monitors the market value of a vehicle, its vehicle parts, and/or a prescribed vehicle treatment to calculate a treatment complexity level, e.g., vehicle repair, total loss; for treating the damaged vehicle.

19 Claims, 9 Drawing Sheets

(56) References Cited

U.S. PATENT DOCUMENTS

| | | | | |
|---|---|---|---|---|
| 7,931,037 B1* | 4/2011 | Ryan | E04H 15/58 | 135/117 |
| 8,117,090 B2* | 2/2012 | Romero | G06Q 30/02 | 705/26.1 |
| 8,200,513 B2* | 6/2012 | Vahidi | G06Q 10/10 | 705/305 |
| 8,595,079 B1* | 11/2013 | Raines | G06Q 30/0201 | 705/26.1 |
| 8,600,823 B1* | 12/2013 | Raines | G06Q 30/02 | 705/26.1 |
| 8,655,776 B2* | 2/2014 | Cheung | G06Q 30/00 | 705/35 |
| 8,694,328 B1* | 4/2014 | Gormley | G06Q 30/0621 | 705/1.1 |
| 8,719,134 B1* | 5/2014 | Huls | G06Q 30/0283 | 705/35 |
| 8,799,034 B1* | 8/2014 | Brandmaier | G06Q 40/08 | 705/4 |
| 8,972,100 B2* | 3/2015 | Mullen | G06Q 40/08 | 701/31.4 |
| 8,977,425 B1* | 3/2015 | Mullen | G06Q 40/08 | 701/31.4 |
| 9,019,092 B1* | 4/2015 | Brandmaier | B60R 25/102 | 340/426.1 |
| 2002/0051673 A1* | 5/2002 | Lowery | B05C 17/10 | 401/266 |
| 2003/0014302 A1* | 1/2003 | Jablin | B60L 3/12 | 705/13 |
| 2003/0200151 A1* | 10/2003 | Ellenson | G06Q 30/0278 | 705/306 |
| 2004/0044549 A1* | 3/2004 | Loop | G06Q 40/08 | 705/4 |
| 2005/0086070 A1* | 4/2005 | Engelman | G06Q 10/087 | 705/28 |
| 2005/0108112 A1* | 5/2005 | Ellenson | G06Q 30/0278 | 705/306 |
| 2005/0267774 A1* | 12/2005 | Merritt | G06Q 10/0637 | 705/306 |
| 2006/0064367 A1* | 3/2006 | Block | G06Q 40/00 | 705/35 |
| 2006/0074790 A1* | 4/2006 | Anspach | G06Q 30/02 | 705/35 |
| 2006/0095302 A1* | 5/2006 | Vahidi | G06Q 10/10 | 705/4 |
| 2006/0155614 A1* | 7/2006 | Woytowick | G06Q 30/00 | 705/4 |
| 2006/0167702 A1* | 7/2006 | Jodoin | B60R 25/00 | 705/1.1 |
| 2006/0195384 A1* | 8/2006 | Bauer | G06Q 30/06 | 705/37 |
| 2006/0253351 A1* | 11/2006 | Keaney | G06Q 40/08 | 705/4 |
| 2006/0265235 A1* | 11/2006 | Schuchardt | G06Q 30/0645 | 705/307 |
| 2006/0287895 A1* | 12/2006 | Salas | G06Q 40/08 | 705/4 |
| 2007/0021986 A1* | 1/2007 | Cheung | G06Q 30/00 | 705/4 |
| 2007/0067075 A1* | 3/2007 | McMillan | B60S 5/00 | 701/31.4 |
| 2007/0136163 A1* | 6/2007 | Bell | G06Q 20/12 | 705/35 |
| 2007/0156552 A1* | 7/2007 | Manganiello | G06Q 40/02 | 705/35 |
| 2007/0179860 A1* | 8/2007 | Romero | G06Q 99/00 | 705/14.51 |
| 2007/0293997 A1* | 12/2007 | Couch | G01M 17/00 | 701/31.4 |
| 2007/0299751 A1* | 12/2007 | Jenkins | G06Q 30/04 | 705/31 |
| 2008/0052216 A1* | 2/2008 | Johnson | G06Q 40/04 | 705/37 |
| 2008/0133425 A1* | 6/2008 | Grush | G06Q 10/0637 | 705/80 |
| 2008/0235116 A1* | 9/2008 | Jensen | G06Q 30/0603 | 705/28 |
| 2008/0243556 A1* | 10/2008 | Hogan | G06Q 10/087 | 705/4 |
| 2008/0255887 A1* | 10/2008 | Gruter | G06Q 40/08 | 705/4 |
| 2008/0306996 A1* | 12/2008 | McClellan | G06Q 10/06 | |
| 2009/0216565 A1* | 8/2009 | Opyd, III | G06Q 40/08 | 705/4 |
| 2009/0271296 A1* | 10/2009 | Romero | G06Q 30/02 | 705/26.1 |
| 2009/0299857 A1* | 12/2009 | Brubaker | G06Q 30/0269 | 705/14.66 |
| 2010/0138242 A1* | 6/2010 | Ferrick | G06Q 10/087 | 705/4 |
| 2010/0274571 A1* | 10/2010 | McFall | G06Q 30/06 | 705/1.1 |
| 2010/0274631 A1* | 10/2010 | McFall | G06Q 30/0203 | 705/7.32 |
| 2010/0293181 A1* | 11/2010 | Muller | G06Q 30/06 | 707/759 |
| 2010/0299190 A1* | 11/2010 | Pratt | G06Q 30/02 | 705/14.4 |
| 2010/0317420 A1* | 12/2010 | Hoffberg | G06Q 30/0207 | 463/1 |
| 2011/0004513 A1* | 1/2011 | Hoffberg | G06Q 30/0207 | 705/14.1 |
| 2011/0173086 A1* | 7/2011 | Berkowitz | G06Q 30/08 | 705/26.3 |
| 2011/0202374 A1* | 8/2011 | Vahidi | G06Q 10/10 | 705/4 |
| 2011/0202423 A1* | 8/2011 | Pratt | G06Q 30/02 | 705/26.7 |
| 2011/0313936 A1* | 12/2011 | Sieger | G06Q 10/083 | 705/306 |
| 2012/0005070 A1* | 1/2012 | McFall | G06Q 40/025 | 705/38 |
| 2012/0005108 A1* | 1/2012 | Hollenshead | G06Q 30/0278 | 705/306 |
| 2012/0215568 A1* | 8/2012 | Vahidi | G06Q 10/10 | 705/4 |
| 2012/0239582 A1* | 9/2012 | Solari | G06Q 40/04 | 705/306 |
| 2012/0297337 A1* | 11/2012 | St. Denis | G06Q 10/06313 | 715/810 |
| 2013/0006809 A1* | 1/2013 | Hollenshead | G06Q 30/06 | 705/26.41 |
| 2013/0047111 A1* | 2/2013 | Couch | G01M 17/00 | 715/771 |
| 2013/0080307 A1* | 3/2013 | Hoffberg | G06Q 10/0631 | 705/35 |
| 2013/0124366 A1* | 5/2013 | Breed | G06Q 30/0623 | 705/26.61 |
| 2013/0262255 A1* | 10/2013 | Haynes, III | G06Q 30/06 | 705/26.2 |
| 2014/0019286 A1* | 1/2014 | Fannin | G06Q 30/08 | 705/26.3 |
| 2014/0025403 A1* | 1/2014 | Vahidi | G06Q 10/10 | 705/4 |
| 2014/0058956 A1* | 2/2014 | Raines | G06Q 30/0201 | 705/306 |
| 2014/0222820 A1* | 8/2014 | Mott | G06Q 10/08 | 707/740 |
| 2014/0277916 A1* | 9/2014 | Mullen | G06Q 40/08 | 701/31.4 |
| 2014/0278571 A1* | 9/2014 | Mullen | G06Q 40/08 | 705/4 |
| 2014/0278572 A1* | 9/2014 | Mullen | G06Q 40/08 | 705/4 |
| 2014/0278576 A1* | 9/2014 | Mariyal | G06Q 40/08 | 705/4 |
| 2014/0358641 A1* | 12/2014 | Friedman | G06Q 30/0206 | 705/7.35 |

(56) References Cited

U.S. PATENT DOCUMENTS

| | | | | |
|---|---|---|---|---|
| 2015/0039397 A1* | 2/2015 | Fuchs | ............... | G06Q 30/0283 705/7.35 |
| 2015/0120484 A1* | 4/2015 | Kaganov | ............... | G06Q 30/08 705/26.3 |
| 2015/0178849 A1* | 6/2015 | Berger | .................. | G06Q 40/08 705/4 |
| 2015/0178852 A1* | 6/2015 | Mullen | .................. | G06Q 40/08 705/4 |

OTHER PUBLICATIONS

Final Office Action for U.S. Appl. No. 14/732,331 dated Jun. 17, 2016.
Notice of Allowance issued in U.S. Patent Application No. 14/732,331 dated Jun. 16, 2017.
Wan et al., "IoT Sensing Framework with Inter-Cloud Computing Capability in Vehicular Networking," *Electron Commer Res*, 14:389-416, (2014).

* cited by examiner

SYSTEM, METHOD, AND COMPUTER-READABLE MEDIUM FOR FACILITATING TREATMENT OF A VEHICLE DAMAGED IN A CRASH

RELATED APPLICATIONS

This application claims priority to and the benefit of the filing date of U.S. Provisional Patent Application No. 62/023,711 entitled "SYSTEM AND METHOD FOR AUTOMATED VEHICLE REPAIR TRIAGE," filed on Jul. 11, 2014, the entire contents of which is hereby expressly incorporated by reference. Additionally, this application is related to the following application:

Co-pending U.S. patent application Ser. No. 14/732,331, entitled "SYSTEM, METHOD, AND COMPUTER-READABLE MEDIUM FOR FACILITATING DELIVERY OF REPLACEMENT PARTS FOR A DAMAGED VEHICLE" and filed concurrently herewith, the entire disclosure of which are hereby expressly incorporated by reference.

TECHNICAL FIELD

The present disclosure generally relates to a system and a method for treating a vehicle damaged in a crash.

BACKGROUND

Each day, numerous vehicles are involved in collisions that result in varying amounts of damage to the vehicle. If the damaged vehicle is insured, an insurance claim is typically filed sometime after the collision. Treatment of the damaged vehicle generally depends on the extent of the vehicle damage and an inaccurate assessment of the vehicle damage may result in an incorrectly prescribed treatment for the vehicle. By using a timely monitored market value of a vehicle, its vehicle parts, and/or one or more potentially prescribed vehicle treatments (e.g., replacement vehicle part(s) and/or vehicle treatment service), the accuracy of a calculated vehicle treatment for a damaged vehicle may be ensured.

SUMMARY

In accordance with a first example aspect of the invention, a method implemented on a computer system for facilitating treatment of a vehicle damaged in a crash includes: receiving, by one or more processors, vehicle market information of a vehicle type that includes the damaged vehicle, the vehicle market information including a market value for the vehicle type, a vehicle part for the vehicle type that includes the damaged vehicle, and/or a prescribed vehicle treatment for the vehicle type that includes the damaged vehicle; incorporating, by the one or more processors, the received vehicle market information with vehicle collision data stored in a memory device; monitoring, by the one or more processors, the market value for the vehicle type, the vehicle part, and/or the prescribed vehicle treatment; detecting, by the one or more processors, a change in the monitored market value for the vehicle type, the vehicle part, and/or the prescribed vehicle treatment; modifying, via the one or more processors, the vehicle collision data with the detected change in the monitored market value for the vehicle type, the vehicle part, and/or the prescribed vehicle treatment; receiving crash information about the damaged vehicle; determining a vehicle treatment complexity level associated with treating the damaged vehicle based on the received crash information and the modified vehicle collision data; selecting a vehicle treatment facility for treating the damaged vehicle based on the determined treatment complexity level; and transmitting information associated with treating the damaged vehicle.

In another embodiment implemented on a computer system, a method for facilitating treatment of a vehicle damaged in a crash is executed by one or more processors programmed to perform the method. The method includes: receiving, by one or more processors, vehicle market information of a vehicle type that includes the damaged vehicle, the vehicle market information including a market value for the vehicle type that includes the damaged vehicle, a vehicle part for the vehicle type that includes the damaged vehicle, and/or a prescribed vehicle treatment for the vehicle type that includes the damaged vehicle; incorporating, by the one or more processors, the received vehicle market information with vehicle collision data stored in a memory device, wherein the vehicle collision data includes a vehicle treatment code; monitoring, by the one or more processors, the market value for the vehicle type, the vehicle part, and/or the prescribed vehicle treatment; detecting, by the one or more processors, a change in the monitored value for the vehicle type, the vehicle part, and/or the prescribed vehicle treatment; modifying, via the one or more processors, the vehicle treatment code to include the detected change in the monitored market value for the vehicle type, the vehicle part, and/or the prescribed vehicle treatment; receiving crash information about the damaged vehicle; determining a vehicle treatment complexity level associated with treating the damaged vehicle based on the received crash information and the modified vehicle treatment code; selecting a vehicle treatment facility for treating the damaged vehicle based on the determined treatment complexity level; and transmitting information associated with treating the damaged vehicle.

In another embodiment, a computer system for facilitating treatment of a vehicle damaged in a crash includes a computing device including one or more processors and one or more memory devices coupled to the one or more processors of the computing device, wherein the one or more memory devices storing executable instructions that when executed by the one or more processors of the computing device cause the computer system to: receive vehicle market information of a vehicle type that includes the damaged vehicle, the vehicle market information including a market value for the vehicle type, a vehicle part for the vehicle type that includes the damaged vehicle, and/or a prescribed vehicle treatment for the vehicle type that includes the damaged vehicle; incorporate the received vehicle market information with vehicle collision data stored in a memory device; monitor the market value for the vehicle type, the vehicle part, and/or the prescribed vehicle treatment; detect a change in the monitored market value for the vehicle type, the vehicle part, and/or the prescribed vehicle treatment; modify the vehicle collision data with the detected change in the monitored market value for the vehicle type, the vehicle part, and/or the prescribed vehicle treatment; receive crash information about the damaged vehicle; determine a vehicle treatment complexity level associated with treating the damaged vehicle based on the received crash information and the modified vehicle collision data; select a vehicle treatment facility for treating the damaged vehicle based on the determined treatment complexity level; and transmit information associated with treating the damaged vehicle.

In a further embodiment, a tangible, computer-readable medium stores instructions, which when executed by one or more processors of a computer system, cause the computer system to: receive vehicle market information of a vehicle type that includes the damaged vehicle, the vehicle market information including a market value for the vehicle type, a vehicle part for the vehicle type that includes the damaged vehicle, and/or a prescribed vehicle treatment for the vehicle type that includes the damaged vehicle; incorporate the received vehicle market information with vehicle collision data stored in a memory device; monitor the market value for the vehicle type, the vehicle part, and/or the prescribed vehicle treatment; detect a change in the monitored market value for the vehicle type, the vehicle part, and/or the prescribed vehicle treatment; modify the vehicle collision data with the detected change in the monitored market value for the vehicle type, the vehicle part, and/or the prescribed vehicle treatment; receive crash information about the damaged vehicle; determine a vehicle treatment complexity level associated with treating the damaged vehicle based on the received crash information and the modified vehicle collision data; select a vehicle treatment facility for treating the damaged vehicle based on the determined treatment complexity level; and transmit information associated with treating the damaged vehicle.

These aspects and embodiments utilize crash information and collision data to provide a quick and accurate estimate of a prospective vehicle treatment for a damaged vehicle, thereby enabling a user to address known gaps within the technical field of treating damaged vehicles, such as the effect of an unexpected change in the market values of a vehicle and/or vehicle treatment. For example, the technology described herein monitors such market values and utilizes detected changes in the determination of a vehicle treatment level for the damaged vehicle. Such market value changes may be caused in part by disruptions or changes in vehicle manufacturing, such as the discontinuation of a particular vehicle type (e.g., make and/or model) and the redesign of a vehicle body and/or part. Utilizing a current or dynamic market value, as opposed to a fixed market value, allows for a more accurate determination of the type of vehicle treatment to be calculated and prescribed, for example, repair or scrap/salvage. Thus, the aspects and embodiments described herein improve the processing efficiency of the vehicle treatment system by reducing and/or eliminating the system's processing costs and resources, e.g., processor functionality, network communication traffic, and data memory; involved in facilitating treatment of a vehicle damaged in a crash.

BRIEF DESCRIPTION OF THE DRAWINGS

The figures described below depict various aspects of the systems and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
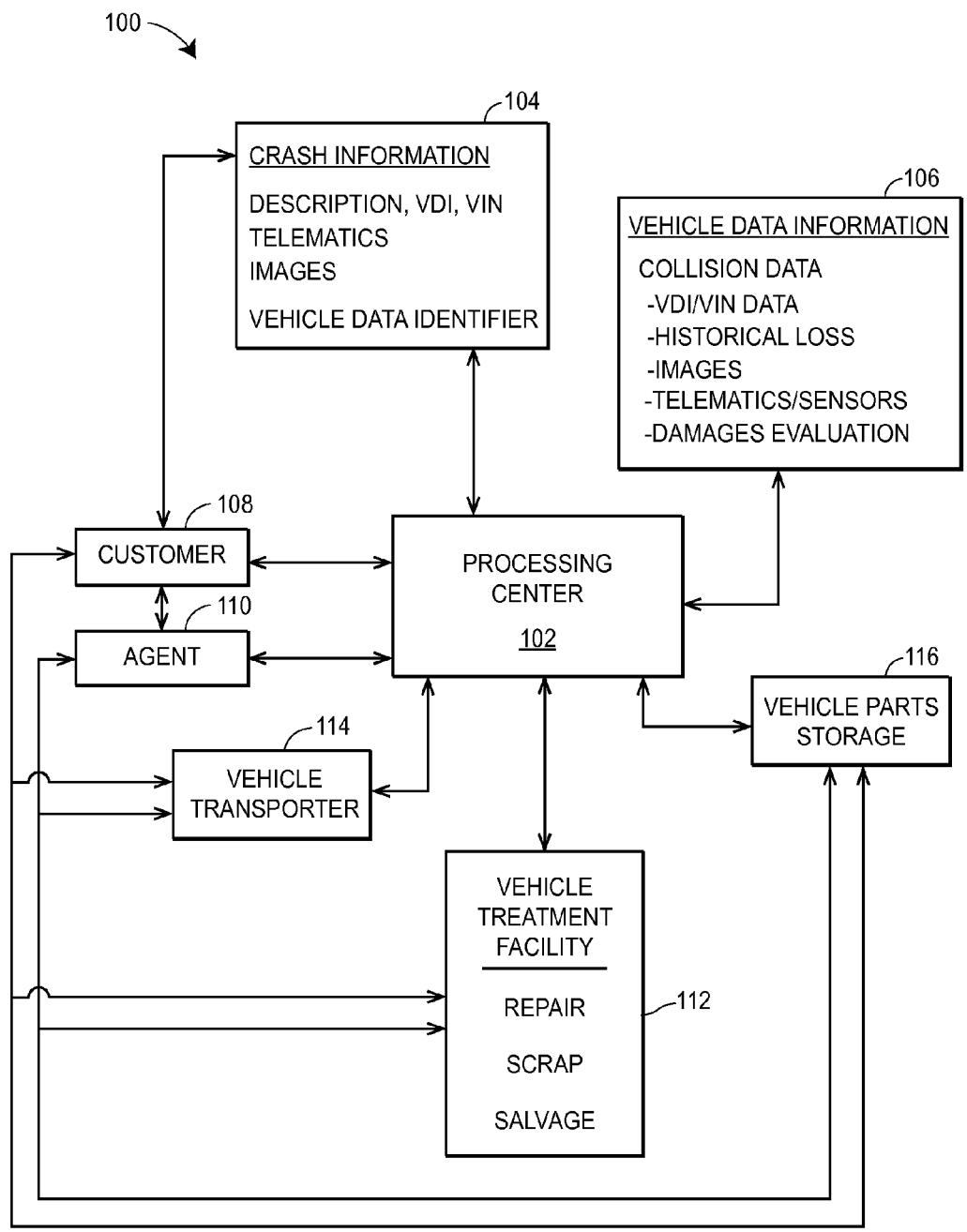
FIG. 1 is a general overview of a vehicle treatment system for treating a vehicle damaged in a crash.

A vehicle treatment system utilizes near real-time monitoring of the market value of a vehicle type, its vehicle parts, and/or one or more arranged vehicle treatments to approximate an extent of damage to a vehicle of the same or similar type and determine a prospective vehicle treatment facility for treating the damaged vehicle. In particular, the system continually monitors the market value of a vehicle, its vehicle parts, and/or a prescribed vehicle treatment to calculate a treatment complexity level, e.g., vehicle repair, total loss; for treating the damaged vehicle. Based on the determined treatment complexity level, the system identifies a treatment facility capable of treating the damaged vehicle and transmits information associated with treating the damaged vehicle.

More specifically, the vehicle treatment system receives crash information associated with a vehicle involved in a crash. The crash information may include information about or associated with the damaged vehicle, sensor data, damage descriptions, and/or images, which may pertain to aspects of the crash, such as vehicle operating characteristics near or at the time of the crash (impact characteristics), e.g., vehicle acceleration, vehicle velocity, and/or impact direction. To estimate the extent of vehicle damage caused in the crash, the system may analyze one or more aspects of the crash information. For example, the system may analyze vehicle operating data received from sensors operatively coupled to the vehicle to calculate an estimate of the amount of vehicle damage. The system may also calculate an estimate of the amount of damage by analyzing a description and/or image of the damaged vehicle. Based on the extent of vehicle damage estimated by the analysis of the crash information, the treatment complexity level for treating the damaged vehicle may be determined.

The analysis for estimating the amount of vehicle damage may include comparing the crash information to collision data of a vehicle type that includes or is similar to the vehicle type of the damaged vehicle. The collision data may include various amounts of vehicle damage associated with specified aspects of collision information related to other vehicles of the same or similar type as the vehicle damaged in the crash.

One or more categories of vehicle damage in the collision data may be equated to a particular vehicle acceleration or velocity, or a range of vehicle acceleration or velocity. The one or more categories of vehicle damage in the collision data may also be equated to a particular description, image, illustration, etc., of a damaged vehicle. Based on the extent of vehicle damage estimated by substantially matching the crash information to comparable collision data, the treatment complexity level for treating the damaged vehicle may be determined.

The treatment complexity level is an estimate indicating the level of involvement, e.g., effort, cost; associated with treating the damaged vehicle. The treatment of the vehicle may include repairing or replacing damaged vehicle parts, and in some instances where repairing the vehicle is too costly and not worth repairing (e.g., total loss), the treatment may include salvaging or scrapping the damaged vehicle. Damaged vehicles designated as a total loss may be sold as is, or repaired to some extent for resale. In addition, the undamaged vehicle parts of a total loss vehicle may be salvaged and stored, reused, or sold.

In some embodiments, the treatment complexity level may be determined for each damaged vehicle part and/or groups of damaged vehicle parts using treatment codes and/or vehicle parts lists. For example, the hood of a damaged vehicle may require minor repairs whereas the fender may be damaged significantly and require major repairs. Alternatively, the treatment complexity level may be determined for groups of vehicle parts using treatment codes and/or lists of damaged and/or undamaged vehicle parts. For example, one treatment code may propose repairs and/or replacement to one group of vehicle parts and be classified as a minor repair, while another treatment code may propose repairs and/or replacement to one critical vehicle part and be classified as a major repair or a total loss.

Several factors may affect the determination of the treatment complexity level, including, and not limited to, the market value of the vehicle type (e.g., make, model, trim level, and/or year of manufacture) that includes the damaged vehicle and corresponding vehicle parts. The treatment complexity level may also be determined in part on the market value of the treatment services provided by treatment personnel involved with the prescribed treatment of the damaged vehicle. Generally, the market value may be based on a set schedule with incremental adjustments over a predetermined period of time, e.g., depreciation over the life expectancy of the vehicle type. However, if the market value should suddenly change due to an unforeseen circumstance, the scheduled market value may become outdated and less useful. Using outdated market values for vehicle parts and/or services may result in miscalculated and inaccurate determinations of the treatment complexity level.

To accommodate for sudden and/or unforeseen changes in the market value of a vehicle, its vehicle parts, and/or potential vehicle treatment services associated with the vehicle, one or more market values may be monitored and used in the determination of the treatment complexity level. For example, on-demand or periodic (e.g., hourly, daily) monitoring of the market value may be implemented to adapt to a sudden and/or unforeseen change in a market value. Some examples of sudden and/or unforeseen changes that may affect the market value of a vehicle, its vehicle parts, and/or associated treatment services include: discontinued production of a type of vehicle (e.g., make, model, trim level), and trends in vehicle popularity. By adapting to sudden and/or unforeseen changes in market value, a calculated and more accurate treatment complexity level may be used in comparison to a fixed-rate and likely defunct market value.

Upon determination of the treatment complexity level, information related to treating the damaged vehicle is transmitted by the system. The transmitted information may be automatically sent after the crash to one or more vehicle treatment facilities, vehicle parts suppliers, vehicle transporters, and/or persons or entities associated with the damaged vehicle, for example, the vehicle owner and/or an insurance agent.

FIG. 1 is a general overview of a system 100 capable of facilitating treatment of a vehicle damaged in a crash. As used herein, the term "vehicle" refers to any type of powered transportation device, which includes, and is not limited to, an automobile, truck, bus, motorcycle, and boat. While the vehicle may normally be controlled by an onboard operator, it is to be understood that the vehicle may be unmanned and remotely or autonomously operated in a conventional or nonconventional manner, such as using controls other than the steering wheel, gear shift, brake pedal, and accelerator pedal.

The system 100 in FIG. 1 includes a processing center 102 capable of facilitating an analysis of the damaged vehicle's crash information 104 to determine a treatment for the damaged vehicle. The analysis of the crash information 104, which may include the use of collision data 106, may be performed by system personnel and/or a computing device at the processing center 102. Throughout this description, the term crash is used in reference to a particular incident in which a particular vehicle of concern was damaged and the term collision is used in reference to one or more incidents in which another vehicle or vehicles were damaged.

The crash information 104 provided to the processing center 102 includes specific information related to a particular vehicle and the crash that damaged the particular vehicle. The crash information 104 may include information received from telematics devices, e.g., sensors, operatively coupled to the vehicle or observed by an individual, such as a vehicle owner 108, a vehicle occupant, a bystander, an insurance agent/entity 110 of the damaged vehicle, an emergency responder, an accident investigator, etc. The crash information 104 may include operating characteristics of the vehicle involved in the crash such as the approximate speed of the vehicle at the time of the crash and what part(s) of the vehicle was damaged. Other observed or obtained crash information provided to system personnel and/or the processing center 102 may include whether emergency response components and/or devices were deployed, e.g., airbags; or if the vehicle is drivable. Images of the damaged vehicle may also be included in the crash information, which may be provided for analysis and/or comparison with the collision data 106.

The vehicle's operating information may be monitored by a series of measurements of conditions or characteristics pertaining to the operation of the vehicle. In particular, one or more computing devices such as a mobile computing device, an on-board computing device, and/or a server device may be communicatively coupled to sensors such as an accelerometer array operatively coupled to the vehicle. The accelerometer array may monitor and/or measure the acceleration/deceleration of the vehicle along several axes and/or travelling directions. Measured operating information such as vehicle acceleration, velocity, and direction may be logged and stored in the system 100, for example, a data storage unit of the system or a remote storage unit communicatively coupled to the system. The operating information may be logged and/or stored discretely, periodically (e.g., every second or portion thereof), or conditionally based on an occurrence or detection of an event (e.g., a crash log).

The detection of a crash involving the vehicle may be facilitated in one or more novel or known ways. A crash may be detected through a near-simultaneous activation of an emergency responsive device, component, or action, such as the deployment of an air-bag, and/or an alarm or alert, e.g., automatic collision notification (ACN), etc. In another embodiment incorporating an accelerometer, a crash may be detected when a computing device operatively coupled to the accelerometer detects a significant, near immediate change (increase or decrease) in the monitored acceleration in the fore-aft, lateral, and/or vertical direction of the vehicle, e.g., X, Y, and Z axes. In a further embodiment, a crash may be detected through the use of a global positioning system (GPS) unit via detection of a near-immediate increase and/or decrease in vehicle velocity.

Additional crash information 104 may include a vehicle identifier such as a vehicle data identifier (VDI) associated with the damaged vehicle involved in the crash. The VDI may include sections or segments relating to one or more aspects or characteristics of the vehicle, such as, a vehicle manufacturer identifier, vehicle type identifier, a vehicle serial number, pointers to other vehicle information/date (e.g., market value), etc., and may include reference to the make, model, trim level, year, and/or type of vehicle as well the vehicle parts of the vehicle. The VDI may also include the vehicle's vehicle identification number (VIN) and/or portions thereof. The VIN identifies a unique vehicle and includes multiple sections or segments in a standardized format that generally depends on the vehicle manufacturer and/or the country or government agency where the VIN is used, e.g., U.S.A., European Union. The sections or segments of the VIN are associated with a vehicle manufacturer identifier, vehicle type identifier, a vehicle serial number, etc., and may include reference to the make, model, trim level, year, and/or type of vehicle as well the vehicle parts of the associated vehicle.

Collision data 106 generally includes records or compilations of information involving other vehicles damaged in other collisions. The collision data 106 may include historical loss information having various collision scenarios including lists of damaged and/or undamaged vehicle parts, images, telematics data, and vehicle damage evaluations. Historical loss information may include recorded amounts of vehicle damage associated with or resulting from known, observed, or measured aspects relating to a collision or impact of a particle make and/or model of vehicle, such as vehicle direction, acceleration, and/or velocity, as well as relative position of vehicle parts within the vehicle. Some examples of historical loss information include vehicle collision test data, bumper test data, collision image data, traffic accident investigations, and the like.

The collision data 106 may be compiled into one or more charts or tables and associated with collision aspects of known vehicle damage. For example, the collision data 106 may be correlated with one or more sections or segments of the VDI and/or VIN, which may further be correlated to vehicle manufacturer information; prescribed vehicle treatments and costs; vehicle part warranties; market value estimations of various vehicle types, vehicle parts, vehicle treatment services, and/or procedures, etc. The collision data 106 may also include vehicle safety information including, and not limited to, vehicle part recall information, safety notices, repair notices, etc. The collision data 106, which may be stored in the system 100 and/or operatively coupled to the processing center 102, may be periodically and/or discretely updated to include additional operating characteristics from other collisions, repair information of other damaged vehicles, and changes to the market value of vehicles, vehicle parts, and/or prescribed vehicle treatment services.

Figure 2:
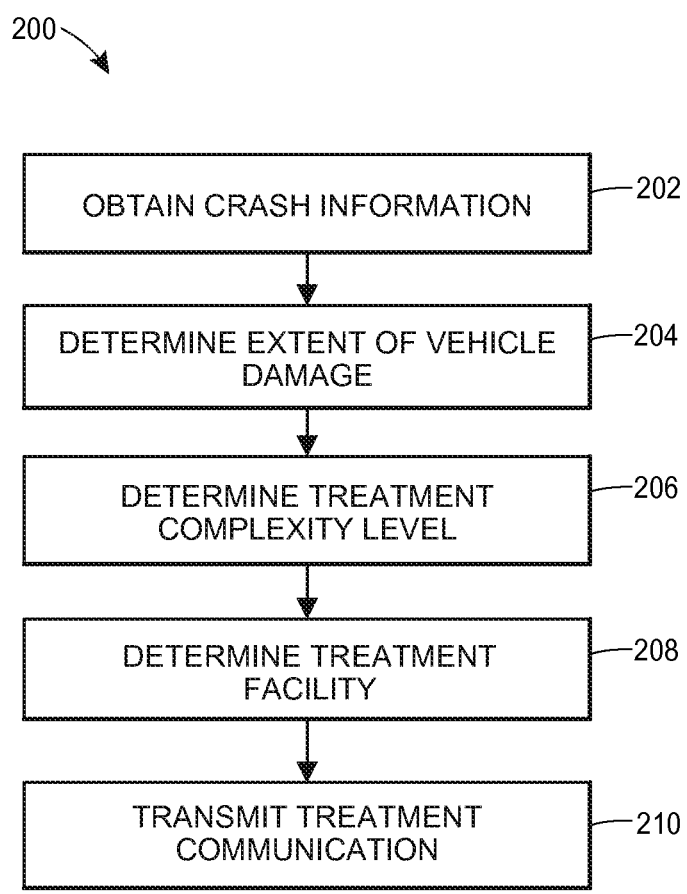
FIG. 2 depicts an example vehicle treatment process capable of being implemented in the vehicle treatment system illustrated in FIG. 1 in accordance with the presently described embodiments.

FIG. 2 is a flow diagram 200 depicting an example embodiment of a vehicle treatment process that may be implemented by the treatment system 100 shown in FIG. 1. The process 200 may be executed separately or cooperatively by system personnel and the processing center 102. Vehicle crash information is received or gathered for analysis (block 202). The vehicle crash information may be provided to system personnel and/or the processing center 102 by a vehicle occupant, bystander, or emergency responder communicating characteristics of the crash. For example, the driver of the damaged vehicle may contact system personnel and/or the processing center 102 and provide operating characteristics of the vehicle near or at the time of the crash, e.g., impact characteristics such as approximate vehicle speed, description and/or image of vehicle damage, description of vehicle operation, and whether portions of the vehicle's safety system were used as a result of the crash. Some crash information, such as the VDI and/or VIN, may have previously been provided to the processing center 102 and/or system personnel.

Crash information may also be automatically provided to system personnel and/or the processing center 102 by the vehicle's engine control unit (ECU) and/or one or more telematics devices or components (sometimes referred to as an event data recorder (EDR)) that are capable of sensing, monitoring, and/or noting various vehicle operating characteristics, e.g., acceleration, velocity, position of vehicle parts relative to the vehicle, direction of the vehicle at the time of the crash, and deployment of emergency response equipment. The telematics devices are operatively coupled to the vehicle and may be configured to automatically function when the vehicle is in operation. When a crash is detected, one or more monitored operating characteristics of the vehicle may be automatically obtained and transmitted to system personnel and/or the processing center 102 as crash information 104.

The crash information 104 may be analyzed and/or evaluated by system personnel and/or the processing center 102 to determine an estimate of the extent of damage caused to the vehicle during the crash (block 204). The compilation of historical collision information 106 including vehicle operating characteristics associated with known vehicle damage from similar vehicles involved in previous collisions may be used to estimate the amount of damage that occurred to the vehicle during the crash. For example, a damage evaluation tool may include a guide or template to be used in estimating the extent of vehicle damage. Stored images and operating characteristics of other similar type vehicles damaged in other collisions may be used in the analysis to correlate with operating characteristics obtained in the crash information of the damaged vehicle. In one embodiment, the extent of vehicle damage resulting from the crash can be estimated by comparing crash information 104, e.g., images and/or vehicle operating characteristics and aspects of the crash; with collision information 106 of other similar type vehicles, e.g., make, model, and or trim level.

Once the extent of vehicle damage caused by the crash has been estimated, a treatment complexity level for treating the damaged vehicle may be determined (block 206) by system personnel and/or the processing center 102. The treatment complexity level may include one or more vehicle treatment components for treating the damaged vehicle, such as a pricing schema having one or more predetermined price structures associated with a vehicle, its vehicle parts, and/or services associated with treating the vehicle, e.g., treatment codes, treatment schedule, skill level and/or pay rate of treatment personnel, and/or equipment of a treatment facility used to treat the damaged vehicle.

The collision data 106 may include a range of treatment complexity levels corresponding to various amounts of vehicle damage, wherein various levels of vehicle damage may be equated with various levels of vehicle treatment. In particular, the range of vehicle treatment complexity levels may be delineated by the amount of involvement associated with treating a damaged vehicle, for example, repairing and/or replacing vehicle parts of the damaged vehicle, or salvaging and/or scrapping a damaged vehicle determined to be a total loss. In some embodiments, the treatment complexity level represents the difficulty associated with treating individual vehicle parts within the damaged vehicle.

The several levels of treatment complexity may include a speed or light repair, a medium or moderate repair, a heavy or severe repair, not repairable, scrap, and salvage, for example. A speed or light repair treatment designation may indicate or estimate that one or two vehicle parts need repair or replacement, or that minor refinishing may be required, but that no structural damage occurred to the vehicle. A medium or moderate repair treatment designation may indicate that a few vehicle parts require repair or replacement or that light structural damage occurred to the vehicle. A heavy or extensive repair treatment designation may indicate that the vehicle is not drivable, significant structural damage occurred to the vehicle, more than a predetermined amount of vehicle parts (e.g., five) need repair or replacement, or a welded-on vehicle component needs replacement. A scrap designation may indicate that the vehicle is to be scrapped not repaired. Prior to scrapping, the damaged vehicle may be dismantled to salvage any undamaged or usable vehicle parts. In some embodiments, the treatment complexity level represents the difficulty associated with treating individual vehicle parts within the damaged vehicle.

Each treatment complexity level may include estimates or indications of the type, time, and/or cost of treatment associated with the type of vehicle (e.g., make, model, year, trim level, etc.) and amount of vehicle parts that may be damaged, e.g., body panel (front, side, rear, quarter-panel, rocker, driver-side, and passenger-side), bumper, radiator, lights, water pump, battery, struts, frame, and gas tank. The estimated extent of vehicle damage determined by system personnel and/or the processing center 102 may include vehicle treatment codes and/or a list of damaged and/or undamaged vehicle parts. By comparing and/or matching the vehicle treatment codes and/or lists of damaged and undamaged vehicle parts of the vehicle damaged in the crash to the vehicle collision data 106, system personnel and/or the processing center 102 may identify the requisite treatment complexity level. For example, a vehicle damage estimate requiring less than 10 hours of labor time and/or $1000 in replacement vehicle parts may be designated as a low treatment complexity level; a vehicle damage estimate requiring between 10-15 hours of labor time and/or between $1000-$2500 in replacement vehicle parts may be designated as a medium treatment complexity level; a vehicle damage estimate requiring between 15-30 hours of labor time and/or between $2500-$5000 in replacement vehicle parts may be designated as a high treatment complexity level; and a vehicle damage estimate requiring more than 30 hours of labor time, and/or having costs and labor greater than the market value of the damaged vehicle in an undamaged condition, may be designated as a total loss, scrapping, and/or salvaging treatment complexity level. The total loss, scrapping, and/or salvaging designation indicates that the vehicle is not to be repaired. For such non-repairable designations, the damaged vehicle may be dismantled to salvage any undamaged or usable vehicle parts, wherein the remaining vehicle parts may be scrapped or sold.

Each damaged vehicle part and/or group of vehicle parts may be assigned a vehicle treatment code from a set of vehicle treatment codes based on the extent of the damage to the vehicle and/or vehicle part(s). The set of vehicle treatment codes may include a separate vehicle treatment code for each combination of crash characteristics, such as the make, model, year, and/or trim level of the vehicle being treated; the vehicle part or a list of vehicle parts being treated; the type of treatment for the vehicle part(s) including whether the vehicle part(s) needs to be repaired, replaced salvaged, or scrapped; the extent of the damage to the vehicle part(s), etc. Each vehicle treatment code may include and/or correspond to a cost estimate. For example, a specific vehicle treatment code may include repairing the hood of a first particular vehicle type (make, model, etc.) with slight damage. Another specific vehicle treatment code may include replacing the bumper of a second particular vehicle type with heavy damage. The associated cost estimate for the vehicle treatment code for the first vehicle type may be $100 whereas the associated cost estimate for the treatment code for the second vehicle type may be $500. Each assigned vehicle treatment code may be combined to determine a total cost estimate for treating the damaged vehicle.

Figure 3:
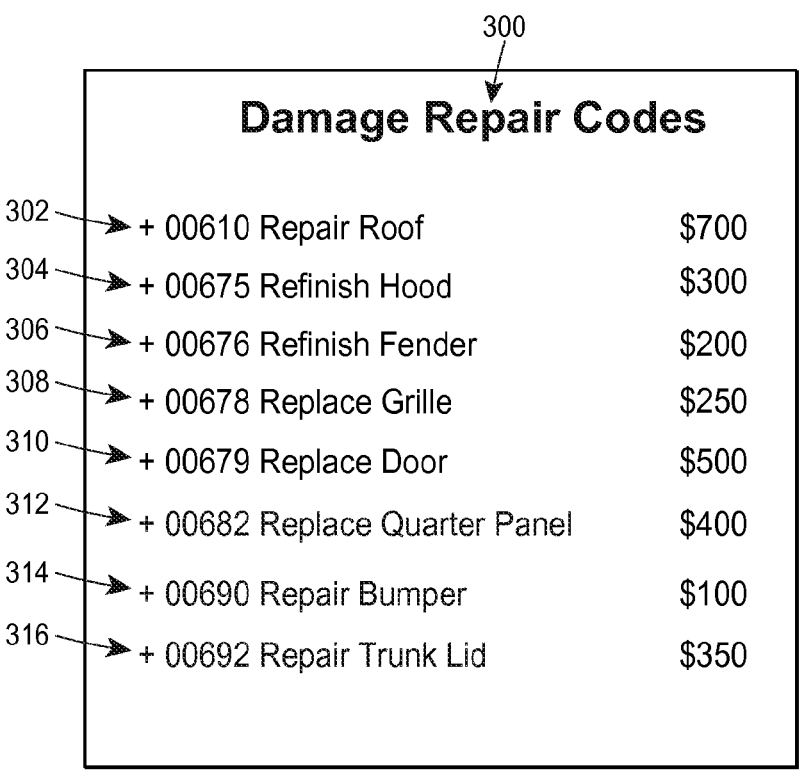
FIG. 3 depicts an example table of vehicle treatment codes (e.g., repair) for estimating the cost of repairing vehicle damage in accordance with the presently described embodiments.

Referring now to FIG. 3, an example table 300 of vehicle treatment codes for estimating the cost of treating vehicle damage is depicted. It is to be understood that while the example table 300 includes example repair treatment codes that may be a small subset of a larger set of vehicle repair codes, other type of vehicle treatment codes may include or pertain to vehicle treatment of total loss vehicles relating to salvaging and/or scrapping values of undamaged vehicle parts. As mentioned above, the set of vehicle treatment codes may include a separate vehicle treatment code for each combination of vehicle characteristics such as make and model of the vehicle being repaired, the vehicle part being repaired, the type of repair for the vehicle part including whether the vehicle part needs to be repaired and/or replaced, the extent of the damage to the vehicle part, etc. Each vehicle treatment code may correspond to a cost estimate, where the cost estimate may be determined based on collision data including historical loss information of similar type vehicles having similar type damage. For example, the associated cost estimate for a repair code corresponding to repairing the quarter panel of a particular make, model, trim level, etc. (e.g., type) of vehicle having moderate damage may be determined by analyzing repair costs from historical loss information related to repairing quarter panels of that particular type of vehicle having moderate damage from past collisions. In some embodiments, the vehicle treatment codes may be stored in the system 100 and/or operatively coupled to the processing center 102.

As shown in FIG. 3, repair code 00675 (reference 304) is associated with an instruction, "Refinish Hood," and a cost estimate, $300. While the instruction for repair code 00675 (reference 304) does not specify the extent of the damage to the hood, or the make and model of the vehicle, repair code 00675 (reference 304) may be used for refinishing hoods of a particular type of vehicle with light damage. In some embodiments, a separate repair code, for example, 10675 may be used for refinishing hoods for vehicles of a different particular type of vehicle with light damage. Moreover, yet another repair code, for example, 02675, may be used for refinishing hoods on vehicles with moderate damage. Further, in some embodiments, the set of repair codes may be based on additional or alternative vehicle characteristics and in other embodiments some of the above mentioned vehicle characteristics may be omitted from the set of repair codes.

As further shown in FIG. 3, repair code 00610 (reference 302) is associated with the instruction, "Repair Roof," and a cost estimate of $700; repair code 00676 (reference 306) is associated with the instruction, "Refinish Fender," and a cost estimate of $200; repair code 00678 (reference 308) is associated with the instruction, "Replace Grille," and a cost estimate of $250; repair code 00679 (reference 310) is associated with the instruction, "Replace Door," and a cost estimate of $500; repair code 00682 (reference 312) is associated with the instruction, "Replace Quarter Panel," and a cost estimate of $400; repair code 00690 (reference 314) is associated with the instruction, "Repair Bumper," and a cost estimate of $100; and repair code 00692 (reference 316) is associated with the instruction, "Repair Trunk Lid," and a cost estimate of $350. Each of these repair codes may be for the same particular vehicle type and may be aggregated and/or combined to estimate the total cost of repair for a damaged vehicle of that particular type. For example, by comparing crash information for a damaged vehicle of a particular type to collision data, a list of damaged vehicle parts including the extent of the damage to each vehicle part may be generated. A repair code from the set of repair codes may then be assigned to each damaged vehicle part in the list based on the vehicle characteristics for the damaged vehicle. For example, repair code 00679 (reference 310) may be assigned when a door in a specified type of vehicle needs to be replaced. In some embodiments, repair code 00679 may be assigned twice when two doors in the specified type of vehicle needs to be replaced.

While the example table 300 depicts eight vehicle treatment codes (e.g., vehicle repair codes for a particular type of vehicle), this is merely for ease of illustration only. There may be hundreds or thousands of repair codes each corresponding to a different combination of vehicle characteristics. More specifically, each type may correspond to a separate subset of repair codes including each combination of vehicle characteristics. For example, repair codes 00600-00699 may correspond to one type of vehicle, while repair codes 00700-00799 may correspond to another type of vehicle. The vehicle type may be determined using the VDI/VIN data for the damaged vehicle as described above with reference to FIG. 1. Moreover, in some embodiments, repair codes may also be used in salvaging and/or scrapping treatments. For example, the repair code 19986 may be used for salvaging hoods of a particular type of vehicle in good condition. The associated cost estimate may be a price estimate of the market value of the vehicle part assuming it is sold to a treatment facility or any other auto body shop. The salvage repair codes may have an inverse relationship with the other repair codes. For example, for the salvage repair codes, vehicle parts in better condition may have higher associated price estimates, whereas for the other repair codes, the cost estimates become higher when there is more work that needs to be done to repair the vehicle part. Further, the price estimate may be based on the scarcity/demand for the vehicle part. For example, vehicle parts from an antique or classic car may be in high demand because the car is no longer manufactured. The price estimates for salvage repair codes may be aggregated to determine the total price that an insurance provider can recover by salvaging vehicle parts.

Figure 4:
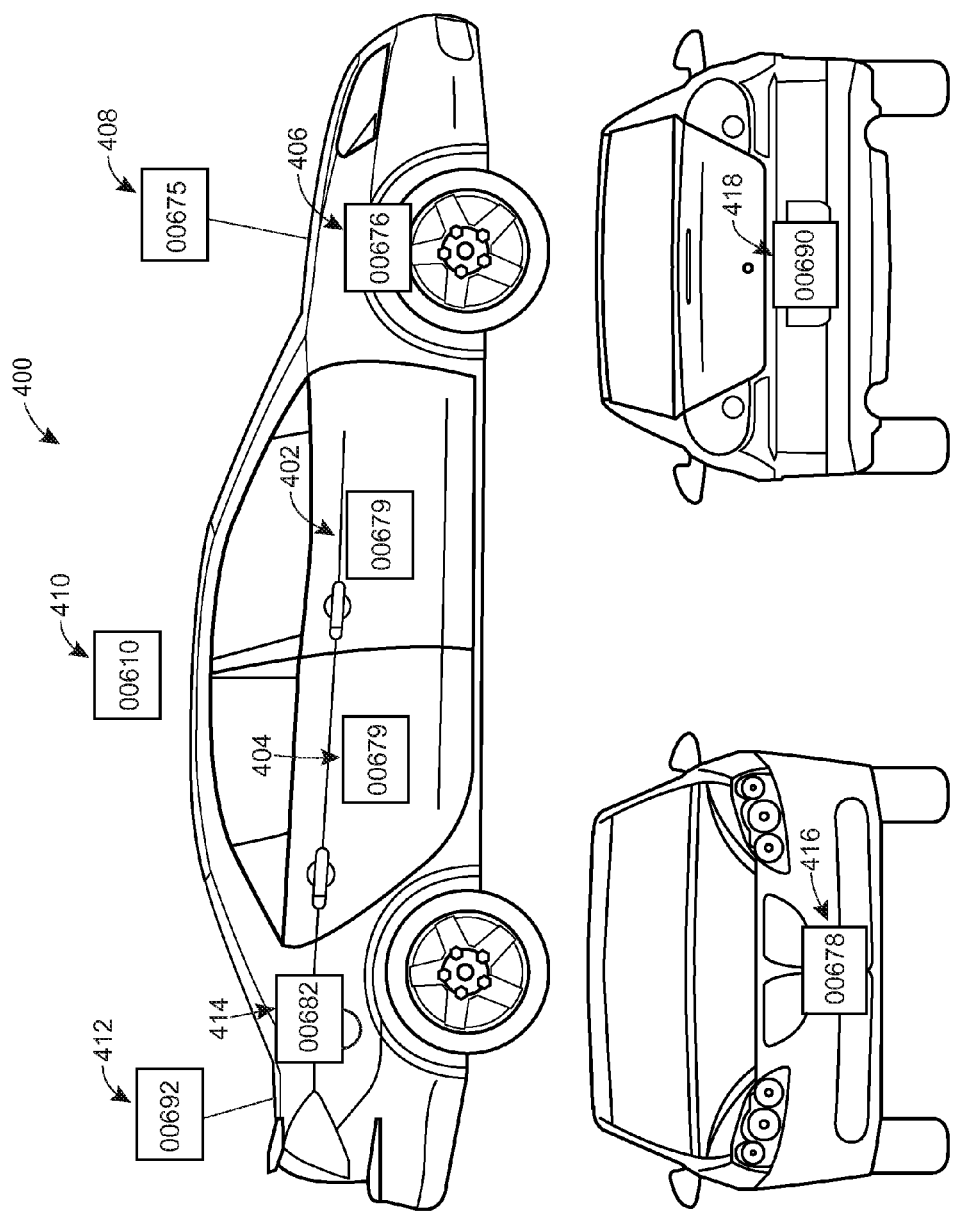
FIG. 4 depicts an example damaged vehicle including vehicle treatment codes (e.g., repair) for various vehicle parts in accordance with the presently described embodiments.

FIG. 4 depicts an example damaged vehicle 400 including repair codes for various vehicle parts. Continuing the example from FIG. 3, the damaged vehicle 400 may be associated with repair codes 00600-00699, which may be assigned to estimate the cost of repairing the vehicle. Moreover, in some embodiments, the repair codes may be provided to a treatment facility for treating the damaged vehicle so the treatment facility knows what needs to be done to repair the vehicle without having to perform an inspection. The repair codes also may be provided to ensure the treatment facility does not miss anything during the repair.

In any event, crash information for the damaged vehicle 400 may be compared to collision data including historical loss information of similar type vehicles damaged in past collisions to determine which vehicle parts are damaged, and the extent of the damage to the vehicle parts including the type of repair necessary (e.g., whether the vehicle part needs to be repaired and/or replaced) as described above in FIG. 3. A repair code from the set of repair codes may then be assigned to each damaged vehicle part in the list based on the vehicle characteristics for the damaged vehicle.

In the example damaged vehicle 400, the two doors 402 and 404 are assigned the repair code 00679 "Replace Door" with an associated cost estimate of $500 for each door. The front, right fender 406 is assigned repair code 00676 "Refinish Fender" with an associated cost estimate of $200, the hood 408 is assigned repair code 00675 "Refinish Hood" with an associated cost estimate of $300, and the roof 410 is assigned repair code 00610 "Replace Roof" with an associated cost estimate of $700. Further, the trunk lid 412 is assigned repair code 00692 "Repair Trunk Lid" with an associated cost estimate of $350, and the rear quarter panel 414 is assigned repair code 00682 "Replace Quarter Panel" with an associated cost estimate of $400. Additionally, the grille 416 is assigned repair code 00678 "Replace Grille" with an associated cost estimate of $250, and the bumper 418 is assigned repair code 00690 "Repair Bumper" with an associated cost estimate of $100. Combining the cost estimates for each of the repair codes corresponding to the damaged vehicle parts, the total cost for repairing the vehicle may be estimated as $3300. This estimate may be used to pay the vehicle owner on the insurance claim, and/or to provide a treatment facility with an expectation of the cost of repair for the damaged vehicle.

Referring again to FIG. 2, upon determination of the estimated treatment complexity level, system personnel and/or the processing center 102 may identify and select a vehicle treatment facility 112 capable of performing the recommended vehicle treatment, for example, repair, salvage, or scrap (block 208). System personnel and/or the processing center 102 may compare the calculated treatment complexity level to prospective treatment facilities capable of providing the necessary vehicle treatment. The selection of a vehicle treatment facility from among the one or more capable treatment facilities may be based on one or more dynamic criterion, such as a pricing structure, treatment facility capability, replacement vehicle part availability, treatment facility location, treatment facility quality rating and/or certification, treatment facility availability, current and/or prior business relationship with the treatment facility, etc., and combinations thereof. One or more of these dynamic criteria may also be weighted and/or prioritized by system personnel and/or the processing center 102 when determining a treatment facility for treatment of the vehicle.

For example, a low complexity vehicle treatment generally may not require a high or specialized skill level and the proximity and/or convenience of a vehicle treatment facility nearer the vehicle owner or the crash site may be considered to be more appropriate. Thus, for a low complexity treatment, the location criterion of the vehicle treatment facility may be weighted and/or prioritized over some of the other criteria. For medium or high complexity vehicle treatments, the skill level and/or performance record of the treatment facility may be considered and thus weighted and/or prioritized over some or all of the other criteria for determining a treatment facility.

In some instances where the damage to the vehicle is too extensive or costly to be repaired and is determined to be a total loss, the damaged vehicle may be salvaged and immediately sold or put up for auction or scrapped and shredded for its scrap metal. Scrapping the vehicle may be appropriated for low dollar, high curb weight vehicles where the value of the damaged vehicle is perceived to be in the scrap metal. In other instances, the damaged vehicle may be dismantled to salvage any value associated with the damaged vehicle. For example, if the damaged vehicle includes undamaged vehicle parts, the vehicle may be dismantled and the undamaged vehicle parts may be harvested and stored in a storage facility for later use and/or sale. The determination to sell or dismantle the damaged vehicle may include consideration of the treatment complexity level, the make, model, and year of the vehicle, and the market demand and/or desirability of particular harvested vehicle parts, e.g., at-risk vehicle parts for vehicles that are no longer in production. Additionally, a higher monetized recovery of the damaged vehicle may be attained if the damaged vehicle is partially repaired and/or dismantled to a varying extent, and then sold. For example, higher value and late model vehicles and/or vehicle parts may be prepared for sale. Such vehicles and vehicle parts, as well as rare or hard to find vehicles and vehicle parts may be privately or publicly sold or auctioned through a salvage treatment facility partnering with an entity using or administrating the treatment system and/or process described herein. Any unwanted vehicle parts that remain after dismantling may be shredded or scrapped.

Upon selection of an appropriate vehicle treatment facility, system personnel and/or the processing center 102 may transmit a communication including information related to the treatment of the damaged vehicle (block 210). The communication may be sent in the form of wired and/or wireless transmission, e.g., SMS text, e-mail, phone call, facsimile, etc. to the identified treatment facility. The communication may also be transmitted to the vehicle owner and/or other one or more other entities authorized by the vehicle owner, such as a vehicle repair facility, a vehicle scrap facility, emergency personnel, an insurance agent, etc. In one example embodiment, system personnel and/or the processing center 102 may contact the identified vehicle treatment facility 112 or a vehicle transporter 114 to facilitate transportation of the damaged vehicle from the crash site to the selected treatment facility, e.g., a service repair center, a scrapping or salvaging facility. For irreparably damaged vehicles (e.g., total loss), the damaged vehicle may be sent to an identified scrapping or salvaging facility to be dismantled where undamaged vehicle parts may be salvaged and stored at a warehouse 116 for reuse and resale before the remaining parts of the damaged vehicle are scrapped.

Additional information related to the treatment of the damaged vehicle may also include: a damage estimate of the damaged vehicle, a request for proposal to treat the damaged vehicle, and/or a query associated with the availability of a replacement vehicle part for the damaged vehicle. For example, system personnel and/or the processing center 102 may communicate information to one or more vehicle parts suppliers to inquire and/or initiate an order of replacement vehicle parts for delivery to a selected vehicle treatment facility. Similarly, system personnel and/or the processing center 102 may communicate information for delivering undamaged vehicle parts salvaged from the damaged vehicle at a salvage/scrap treatment facility to one or more repair treatment facilities and/or a vehicle parts storage facilities.

A response to the transmitted communication may be received by system personnel and/or the processing center 102, which further facilitate treatment of the damaged vehicle. For example, bids from one or more prospective treatment facilities that are offered in response to the request for proposal to treat the damaged vehicle and/or supply vehicle parts may be received by system personnel and/or the processing center 102. A selection of one of the bidding treatment facilities and/or vehicle parts suppliers may be made based on the received bids and confirmed by system personnel and/or the processing center 102. For vehicle treatment, instructions for transporting the damaged vehicle may be sent to the selected treatment facility and/or a vehicle transporter 114; and for vehicle parts, instructions for transporting the vehicle parts may be sent to the selected vehicle parts supplier and/or a delivery company.

Because the market value of a vehicle and its vehicle parts may be expected to gradually diminish over time, the effect of the depreciating market value on the pricing schema of the vehicle treatment process may be accounted for on an annual basis. However, other circumstances may influence the market value of the vehicle, vehicle parts, and/or services associated with treating the vehicle. For example, the closing of a vehicle manufacturer and/or the stoppage of manufacturing operations for a particular vehicle may increase the demand of such vehicle and/or vehicle parts by vehicle treatment facilities, e.g., repairers, restorers, refurbishers, fabricators, salvagers, etc., for a replacement vehicle part associated with the orphaned or discontinued vehicle. Such sudden or unexpected variations in the market value may alter the treatment complexity level from that determined with respect to the expected, scheduled rate of depreciation of the vehicle, its vehicle parts, and/or associated treatment services.

Due to the effect that an unexpected change in the market value of a vehicle, its vehicle parts, and/or associated treatment service may have on the treatment complexity level, it is beneficial to monitor such market values and factors influencing such market values to more timely and accurately calculate the treatment complexity level. The market values of the vehicle, vehicle parts, and/or associated vehicle treatments, as well as circumstances capable of abruptly affecting such market values, may be manually or automatically monitored using one or more vehicle and/or vehicle parts resources, such as suppliers, collectors, manufacturers, repairers, restorers, refurbishers, fabricators, salvagers, etc. The monitoring of the market values may be discrete and/or periodic, e.g., daily, weekly; and implemented in the calculation of the treatment complexity level.

Figure 5:
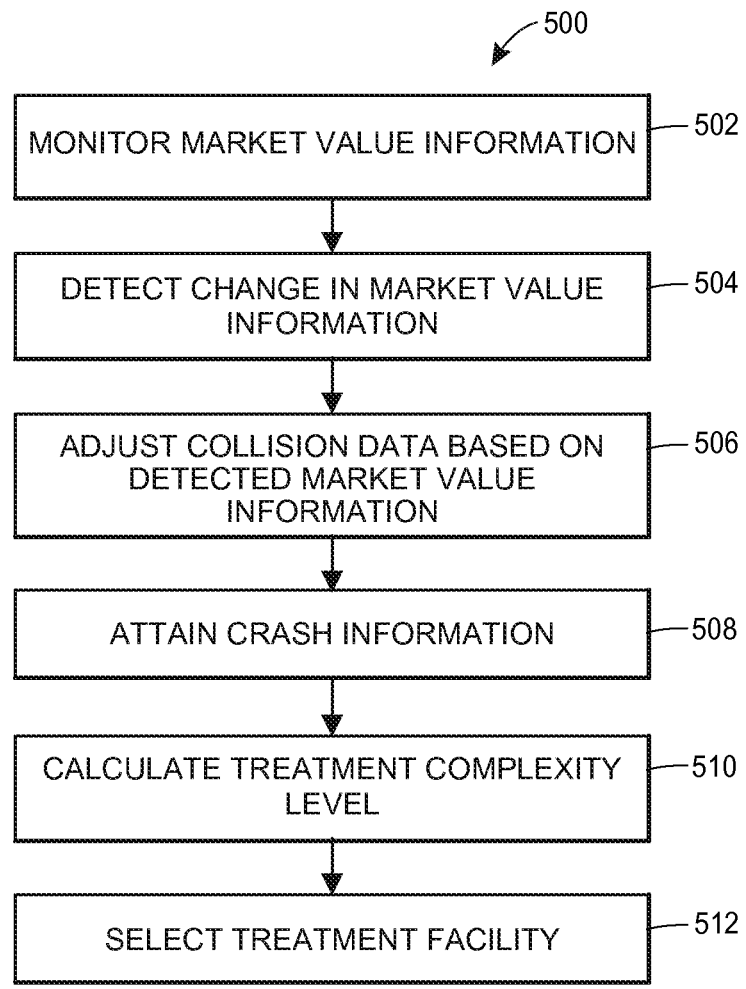
FIG. 5 depicts another example vehicle treatment process capable of being implemented in the vehicle treatment system illustrated in FIG. 1 in accordance with the presently described embodiments.

In FIG. 5, a flow diagram 500 illustrates an example process for routing a damaged vehicle after a crash, wherein the market value of the vehicle, vehicle parts, and/or treatment of the vehicle are considered in the determination of the treatment complexity level. The market value(s) may also include influences, which may be considered, that may affect such market values, for example, economic rates, e.g., inflation, interest; stock market indicators; vehicle related information and/or news, e.g., corporate statements; etc. System personnel and/or the processing system monitor the market value information of one or more vehicle types (block 502). Market value information for a particular vehicle type is received and if a change in the market value of the damaged vehicle and/or its vehicle parts is detected (block 504), system personnel and/or the processing system adjusts the collision information accordingly (block 506). For example, if the cost of a vehicle part and/or a prescribed treatment process for a vehicle has changed, the collision data is modified to reflect the changed cost and/or market value. Crash information of the damaged vehicle is received by system personnel and/or the processing system (block 508). System personnel and/or the processing system utilize the crash information and the adjusted collision information of a vehicle type (e.g., make, mode, trim level, year of manufacture) that includes the damaged vehicle to calculate the vehicle treatment complexity level (block 510). Based on the calculated treatment complexity level, the type of vehicle treatment for the damaged vehicle is determined. System personnel and/or the processing system then utilize the determined vehicle treatment to select a treatment facility for treating the damaged vehicle (block 512).

It therefore can be readily understood from the process illustrated in FIG. 5 that abrupt changes in the market value of a vehicle, its vehicle parts, and/or associated prospective vehicle treatments, which may affect the determination of the type of vehicle treatment, e.g., repair (minor, medium, or heavy repair) or total loss (salvage, scrap); are timely considered to more accurately estimate the treatment complexity level. For example, an unexpected market change in the vehicle, its parts, and/or potential vehicle treatments that are capable of causing a shift in the type of vehicle treatment (e.g., between repair levels, from repair to total loss, and vice versa), but were not aptly considered in the past, are now timely detected and accounted for to ensure the accuracy of a prescribed vehicle treatment.

Figure 6:
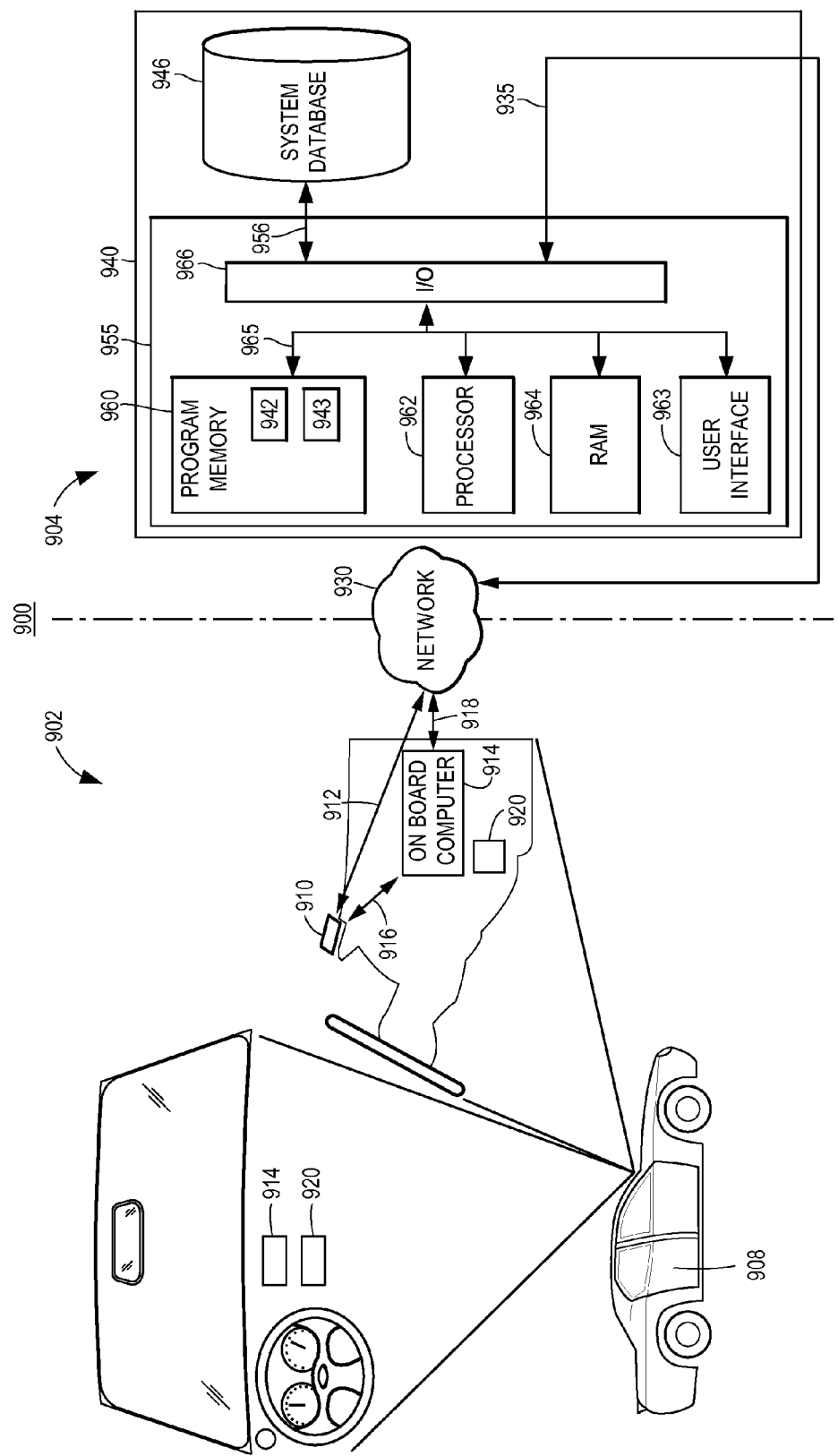
FIG. 6 is a block diagram depicting a mobile computing device, an on-board computing device, a server device, and a communication network that may configured in the example system for treating a damaged vehicle in accordance with the described embodiments.

FIG. 6 illustrates a block diagram of an example treatment system 900 capable of being incorporated into the treatment system 100 shown in FIG. 1 and supporting the processes described herein for treating a vehicle damaged in a crash. The high-level architecture of the vehicle treatment system 900 includes both hardware and software applications, as well as various data communications channels for communicating data between the various hardware and software components. The vehicle treatment system 900 may be divided into front-end components 902 and back-end components 904. The front-end components 902 include one or more computing devices, such as a mobile computing device 910 and/or an on-board computing device 914. Either computing device 910, 914 may be permanently or removably attached to a vehicle 908 and may interface with various sensors coupled to the vehicle 908 (e.g., a speedometer, an accelerometer, a compass, a global position unit (GPS), spatial sensor disposed throughout the vehicle, etc.) and/or may interface with various external output devices in the vehicle 908, such as one or more tactile alert systems, one or more speakers, one or more displays, etc.

Each of the mobile computing device 910 and the on-board computing device 914 is capable of performing all of the functions of the computing device described herein or may supplement the functions performed by the other computing device. The mobile computing device 910 and on-board computing device 914 may communicate with one another directly over a wired or wireless link 916. In addition, the mobile computing device 910 and the on-board computing device 914 may communicate with a network 930 over wired or wireless links 912, 918, respectively. The network 930 may be a proprietary network, a secure public internet, a virtual private network, or some other type of network, such as dedicated access lines, plain ordinary telephone lines, satellite links, etc., and combinations thereof. Where the network 930 comprises the internet, data communications may take place over the network 930 via an internet communication protocol.

The treatment system 900 may also include a notification alert system 920 (e.g., automatic collision notification (ACN), advanced automatic collision or crash notification (AACN), event data recorder (EDR)), that may record and/or transmit information associated with treating the vehicle 908 after being involved in a crash. The front-end components 902 and the back-end components 904 communicate via the communication network 930. The back-end components 904 include a computing device such as a server 940 device or system. The server device 940 may include one or more processors 962 adapted, configured, and/or operatively coupled to and/or within an analyzer to execute various software applications and/or modules of the vehicle treatment system 900, in addition to other software routines. The server device 940 may further include a database 946 adapted to store the various software applications, modules, and/or routines as well as data related to the operation of the vehicle treatment system 900. The data may include, for example, information collected by the mobile computing device 910 and/or the on-board computing device 914 pertaining to the vehicle treatment system 900 and uploaded to the server device 940, such as sensor inputs, analyses corresponding to the methods discussed above, and images. Other kinds of information that may be stored in the database may include historical vehicle collision data compiled from crash data involving vehicles categorized in the same or similar type of vehicle as the vehicle 908 and contact information relating to vehicle service repair and/or salvage treatment facilities, part suppliers, vehicle transporters, vehicle owner, insurance personnel, etc. The computing devices 910, 914 and/or server device 940 may access or store data and/or software applications in the database 946 when executing various functions and tasks associated with the operation of the vehicle treatment system 900.

Although the vehicle treatment system 900 is shown to include one server device 940, one mobile computing device 910, and one on-board computing device 914, it should be understood that additional server devices 940, mobile computing devices 910, and on-board computing devices 914 may be utilized. For example, the system 900 may include several server devices 940 and numerous mobile computing devices 910, all of which may be interconnected via the network 930. As discussed above, the mobile computing device 910 may perform the various functions described herein in conjunction with the on-board computing device 914 or alone. Likewise, the on-board computing device 914 may perform the various functions described herein in conjunction with the mobile computing device 910 or alone. In either instance, the mobile computing device 910 or on-board computing device may not need to be present. Furthermore, the processing performed by the one or more server devices 940 may be distributed among a plurality of server devices 940 configured in an arrangement known as "cloud computing." This arrangement may provide several advantages, such as, for example, enabling near real-time uploads and downloads of information as well as periodic uploads and downloads of information. This arrangement may provide for a thin-client embodiment of the mobile computing device 910 and/or on-board computing device 914 described herein as well as a primary backup of some or all of the data gathered by the mobile computing device 910 and/or on-board computing device 914. All of the information involved with the treatment system 100, for example, crash information, collision data, VDI/VIN data, images, historical loss information, damage evaluation tools, damaged vehicle parts list, inventory of vehicle parts stored at the storage facility, vehicle transporters, treatment centers, customer contact information, insurance agent/entity contact information, etc. may be displayed in a variety of formats at the server device 940, wherein system personnel and/or the processing center 102 is provided access to such information for treating the damaged vehicle.

The server device 940 may have a controller 955 that is operatively connected to the database 946 via a link 956. The controller 955 may also be operatively connected to the network 930 via a communication link 935. It should be noted that, while not shown, additional databases may be linked to the controller 955 in a known manner. The controller 955 may include a program memory 960, a processor 962 (e.g., a microprocessor or a microcontroller), a random-access memory (RAM) 964, input/output (I/O) circuitry 966, and a user interface module 963 all of which may be interconnected via an address/data bus 965. The user interface module 963 facilitates human-to-machine interaction and may include a display screen, keyboard, mouse device, microphone, speaker, etc. Although the I/O circuitry 966 is shown as a single block, the I/O circuitry 966 may include a number of different types of I/O circuits. The program memory 960 may be configured to store computer-readable instructions that when executed by the processor 962 cause the server device 940 to implement a server application 942 and/or a web server 943. The instructions for the server application 942 may cause the server device 940 to implement the methods described herein. While shown as a single block in FIG. 6, it will be appreciated that the server application 942 may include a number of different programs, modules, routines, sub-routines, etc., that may separately or collectively cause the server device 940 to implement the server application 942. It should also be appreciated that although only one processor 962 is shown, the controller 955 may include multiple processors and/or microprocessors. Similarly, the memory of the controller 955 may include multiple RAMs 964 and multiple program memories 960. The RAM(s) 964 and program memories 960 may be implemented as semiconductor memories, magnetically readable memories, and/or optically readable memories, for example. Further, while the instructions for the server application 942 and web server 943 are shown being stored in the program memory 960, the instructions may additionally or alternatively be stored in the database 946 and/or RAM 964.

Alternatively, the vehicle treatment system 900 may include only the front-end components 902. For example, a mobile computing device 910 and/or on-board computing device 914 may perform any and/or all of the processing associated with compiling or gathering crash information, determining a treatment complexity level based on the crash information, determining a treatment for the vehicle based on the a treatment complexity level; and transmitting information associated with the treatment of the vehicle.

Figure 7:
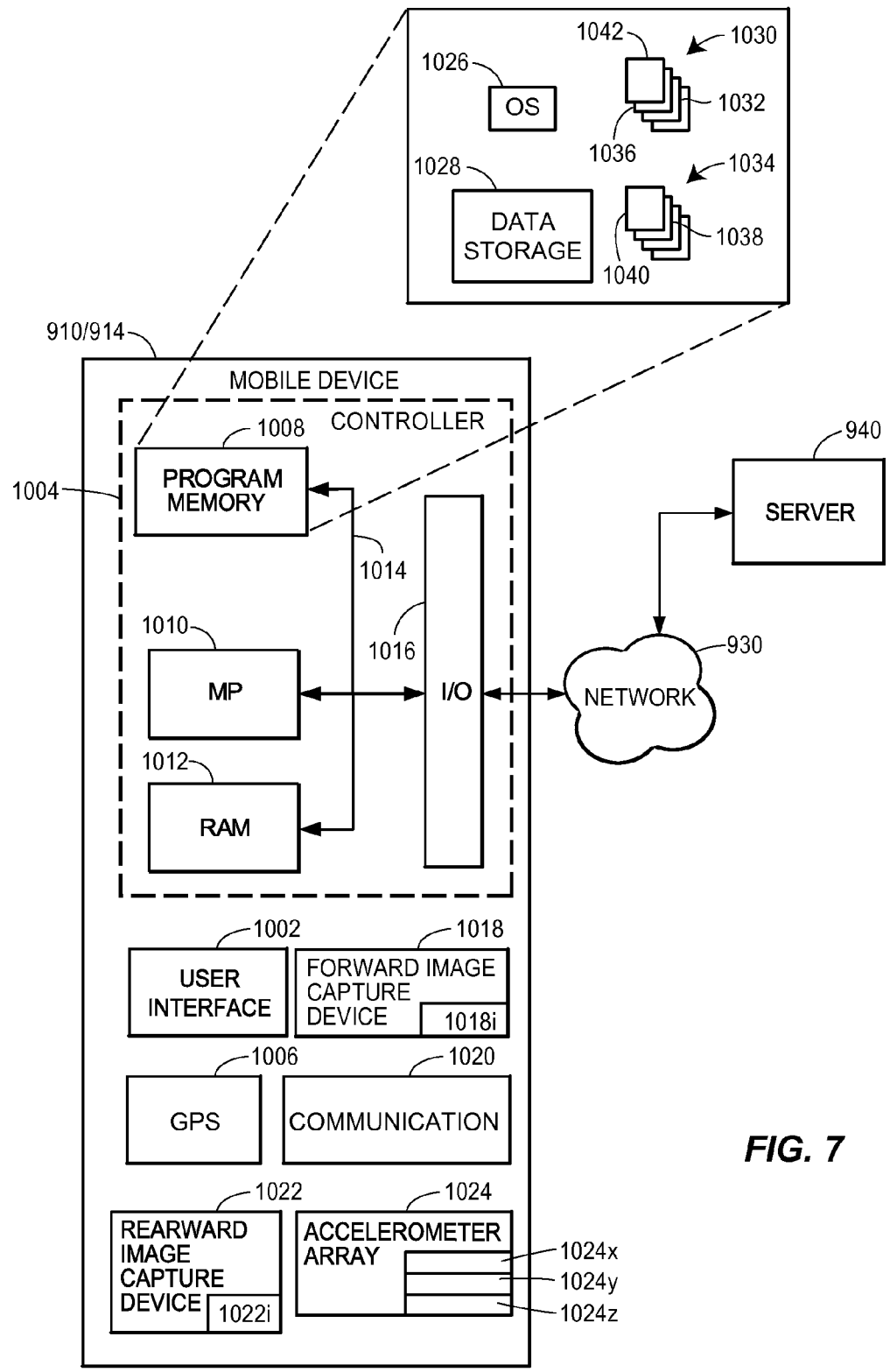
FIG. 7 is a block diagram of an example mobile computing device, on-board computing device, and/or server device capable of being implemented in the system shown in FIG. 6.

Referring now to FIG. 7, the mobile computing device 910 may include a user interface module 1002, a positioning module 1006 such as a global positioning system (GPS) module, a communication module 1020 which may include one or more wireless radios, a forward image capture module 1018, a rearward image capture module 1022, an accelerometer array 1024, and a controller 1004. Similarly, the on-board computing device 914 may include a user interface module 1002, a GPS module 1006, a communication module 1020 which may include one or more wireless radios, a forward image capture module 1018, a rearward image capture module 1022, an accelerometer array 1024, and a controller 1004.

The mobile computing device 910 and on-board computing device 914 may be integrated into a single device that can perform the functions of both devices. It will be appreciated that functions performed by either the mobile computing device 910 or the on-board computing device 914 may also be performed by the on-board computing device 914 in cooperation with the mobile computing device 910. The mobile computing device 910 may be a general-use mobile personal computer, cellular phone, smartphone, tablet computer, wearable computer (e.g., a watch, glasses, etc.), or a device dedicated to facilitating treatment of a damaged vehicle. The on-board computing device 914 may be a general-use on-board computer capable of performing the functions relating to vehicle operation or dedicated to facilitate treatment of a damaged vehicle. The on-board computing device 914 may be installed by the manufacturer of the vehicle 908 or as an aftermarket modification to the vehicle. Further, the mobile computing device 910 and/or on-board computing device 914 may be a thin-client device that outsources some or most processing to the server device 940.

Figure 10:
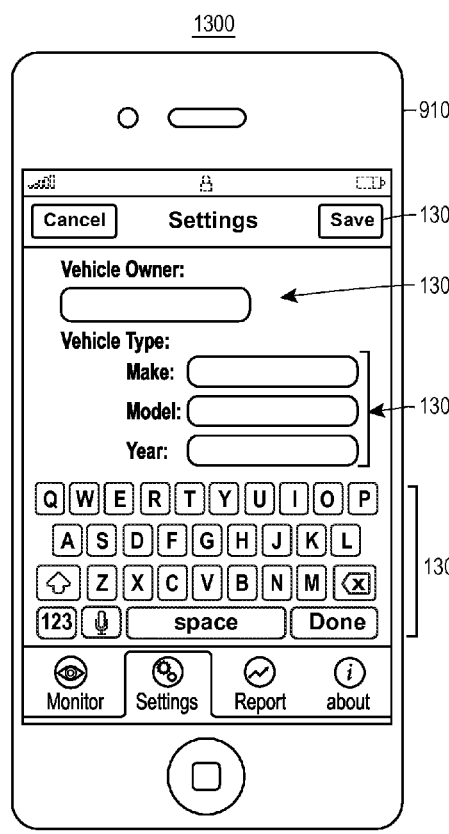

Similar to the controller 955, the controller 1004 includes a program memory 1008, a microprocessor (MP) 1010, a random-access memory (RAM) 1012, and input/output (I/O) circuitry 1016, all of which are interconnected via an address/data bus 1014. Although the I/O circuitry 1016 is depicted in FIG. 10 as a single block, the I/O circuitry 1016 may include a number of different types of I/O circuits. The program memory 1008 includes an operating system 1026, a data storage device 1028, a plurality of software applications 1030, and a plurality of software routines 1034. The operating system 1026 may include one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 1028 may include application data for the plurality of applications 1030, routine data for the plurality of routines 1034, and other data necessary to interact with the server 940 through the network 930. In particular, the data storage device 1028 may include vehicle collision data associated with a vehicle type that includes the vehicle 908. The vehicle type may include the make, model, and year of the vehicle. The vehicle collision data may include one or more compilations of recorded measurements of damaged vehicle parts and components and the corresponding acceleration and derived vectors, e.g., velocity and direction, of such characteristics attributed for the damage. In some embodiments, the controller 1004 may also include, or otherwise be operatively coupled for communication with other data storage mechanisms (e.g., one or more hard disk drives, optical storage drives, solid state storage devices, etc.) that may reside within the mobile computing device 910 and/or on-board computer 914 or operatively coupled to the network 930 and/or server device 940.

The GPS module 1006 may use "Assisted GPS" (A-GPS), satellite GPS, or any other suitable global positioning protocol or system that locates vehicle 908 via the position of the mobile computing device 910 and/or on-board computing device 914. For example, A-GPS utilizes terrestrial cell phone towers or Wi-Fi hotspots (e.g., wireless router points) to more accurately and more quickly determine the location of the vehicle 908 via the mobile computing device 910 and/or on-board computing device 914 while satellite GPS is generally more useful in more remote regions that lack cell towers or Wi-Fi hotspots. The GPS module 1006 may also facilitate the determination of the velocity and direction of the vehicle 908, via the coupling of the mobile computing device 910 and/or on-board computing device 914 to the vehicle.

The accelerometer array 1024 is one example of a telematics device or module that may incorporate one or more accelerometers positioned to determine the acceleration and direction of movements of the mobile computing device 910 and/or on-board computing device 914, which effectively correlate to the acceleration and direction of movements of the vehicle 908. In some embodiments, the accelerometer array 1024 may include an X-axis accelerometer 1024x, a Y-axis accelerometer 1024y, and a Z-axis accelerometer 1024z to measure the acceleration and direction of movement in each respective dimension. It will be appreciated by those of ordinary skill in the art that a three dimensional vector describing a movement of the vehicle 908 via the mobile computing device 910 and/or on-board computing device 914 through three dimensional space can be established by combining the outputs of the X-axis, Y-axis, and Z-axis accelerometers 1024x, y, z using known methods. Single- and multi-axis models of the accelerometer 1024 are capable of detecting magnitude and direction of acceleration as a vector quantity, and may be used to sense orientation and/or coordinate acceleration of the vehicle 908.

The forward and rearward image capture module 1018, 1022 may be built-in cameras within the mobile computing device 910 and/or on-board computing device 914 and/or may be peripheral cameras, such as webcams, cameras installed inside the vehicle 908, cameras installed outside the vehicle 908, etc., that are communicatively coupled with the mobile computing device 910 and/or on-board computing device 914. The image capture module 1018, 1022 may be oriented toward the front and rear of the vehicle 908. For example, the forward image capture module 1018 may be oriented toward the front of the vehicle 908 to observe the forward area of the vehicle 908 while the rearward image capture module 1022 may be oriented toward the rear of the vehicle 908 to observe the rearward area of the vehicle 908, or vice-versa. Some embodiments of the treatment system 900 may have both a forward image capture module 1018 and a rearward image capture module 1022, but other embodiments may have only one or no image capture module. Further, either or both of the forward image capture module 1018 and the rearward image capture module 1022 may include an infrared illuminator 1018i, 1022i, respectively, to facilitate low light and/or night image capturing. Such an infrared illuminator 1018i, 1022i may be automatically activated when light is insufficient for image capturing.

The GPS module 1006, the image capture modules 1018, 1022, and the accelerometer array 1024 may be referred to collectively as the "sensors" of the mobile computing device 910 and/or on-board computing device 914. Of course, it will be appreciated that additional GPS modules 1006, image capture modules 1018, 1022, and/or the accelerometer arrays 1024 may be operatively coupled to the mobile computing device 910 and/or on-board computing device 914. Further, the mobile computing device 910 and/or on-board computing device 914 may also include or be coupled to other sensors such as a thermometer, microphone, thermal image capture device, biomedical sensor, etc. The microphone may be incorporated with the user interface module 1002 and used to receive voice inputs from the vehicle operator while the thermometer and/or thermal image capture device may be used to determine fire or heat damage to the vehicle 908, and the biomedical sensor may capture biological characteristics of the vehicle operator.

The communication module 1020 may communicate with the server device 940 via any suitable wired or wireless communication protocol network, such as a wireless telephony network (e.g., GSM, CDMA, LTE, etc.), a Wi-Fi network (802.11 standards), a WiMAX network, a Bluetooth network, etc. The communication unit 1020 may also be capable of communicating using a near field communication standard (e.g., ISO/IEC 18092, standards provided by the NFC Forum, etc.).

The mobile computing device 910 and/or on-board computing device 914 may include the user-input interface 1002, which may include a "soft" keyboard that is presented on a display screen of the mobile computing device 910 and/or on-board computing device 914, an external hardware keyboard communicating via a wired or a wireless connection (e.g., a Bluetooth keyboard), and an external mouse, or any other suitable user-input device or component (see examples in FIGS. 8-11). As described earlier, the user-input module 1002 may also include a microphone (not shown) capable of receiving voice input from a vehicle operator as well as a display screen.

With reference to the controllers 955, 1004, it should be appreciated that although FIG. 7 depicts only one microprocessor 1010, the controller 1004 may include multiple microprocessors 1010. The memory of the controller 1004 may also include multiple RAMs 1012 and multiple program memories 1008. The controller 1004 may implement the RAM 1012 and the program memories 1008 as semiconductor memories, magnetically readable memories, and/or optically readable memories, for example. The one or more processors 1010 may be adapted, configured, and/or operatively coupled to and/or within an analyzer to execute any of the plurality of software applications 1030 and/or any of the plurality of software routines 1034 residing in the program memory 1008, in addition to other software applications. One of the plurality of applications 1030 may be a client application 1032 that may be implemented as a series of machine-readable instructions for performing the various functions associated with implementing the vehicle treatment system 900 as well as receiving information at, displaying information on, and transmitting information from the mobile device 910 and/or the on-board computing device 914. A client application 1032 may function to implement a system wherein the front-end components 902 communicate and cooperate with back-end components 904 as described above. The client application 1032 may include machine-readable instructions for implementing the user interface 1002 to allow a user to input commands to, and receive information from, the vehicle treatment system 900. One of the plurality of applications 1030 may be a native web browser 1036, such as Apple's Safari®, Google Android™ mobile web browser, Microsoft Internet Explorer® for Mobile, Opera Mobile™, that may be implemented as a series of machine-readable instructions for receiving, interpreting, and displaying web page information from the server device 940 or other back-end components 904 while also receiving inputs from the vehicle operator. Another application of the plurality of applications may include an embedded web browser 1042 that may be implemented as a series of machine-readable instructions for receiving, interpreting, and displaying web page information from the server device 940 or other back-end components 904 within the client application 1032.

Another of the plurality of client applications 1030 or routines 1034 may include an accelerometer routine 1038 that determines the acceleration and direction of movements of the mobile computing device 910 and/or on-board computing device 914, which correlate to the acceleration and direction of the vehicle 908. The accelerometer routine may process data from the accelerometer array 1024 to determine one or more vectors describing the motion of the vehicle 908 for use with the client application 1032. In some embodiments where the accelerometer array 1024 has X-axis, Y-axis, and Z-axis accelerometers 1024$x,y,z$, the accelerometer routine 1038 may combine the data from each accelerometer 1024$x,y,z$ to establish the vectors describing the motion of the vehicle 908 as it moves through three dimensional space. In some embodiments, the accelerometer routine 1038 may use data pertaining to less than three axes.

Another routine in the plurality of applications 1030 or routines 1034 may include a vehicle velocity routine 1040 that coordinates with the GPS module 1006 to retrieve vehicle velocity and direction information for use with one or more of the plurality of applications, such as the client application 1032, or for use with other routines.

Yet another routine in the plurality of applications 1030 or routines 1034 may include an image capture routine that coordinates with the image capture modules 1018, 1022 to retrieve image data for use with one or more of the plurality of applications, such as the client application 1032, or for use with other routines.

Another routine in the plurality of application 1030 or routines 1034 may include a position determination routine that coordinates with the spatial sensors disposed throughout the vehicle to determine the positions of vehicle parts relative to the vehicle for use with one or more of the plurality of applications, such as the client application 1032, or for use with other routines.

The user or vehicle operator may also launch or instantiate any other suitable user interface application (e.g., the native web browser 1036, or any other one of the plurality of software applications 1030) to access the server device 940 to implement the vehicle treatment system 900. Additionally, the user or vehicle operator may launch the client application 1032 from the mobile computing device 910 and/or on-board computing device 914, to access the server device 940 to implement the vehicle treatment system 900.

After the vehicle operating information (e.g., acceleration, velocity, and direction) has been gathered or determined by the sensors or the mobile computing device 910 and/or on-board computing device 914, previously recorded collision data may be utilized to determine the extent of damage to the vehicle 908 involved in a crash. Once the extent of the damage has been assessed, a treatment for the vehicle 908 can be determined. For example, the mobile computing device 910 and/or on-board computing device 914 may determine that the damaged vehicle can be repaired or scrapped, and where the damaged vehicle may be taken for such treatment. The mobile computing device 910 and/or on-board computing device 914 may also transmit information associated with the treatment of the damaged vehicle. For example, the transmitted information may be sent to a treatment facility capable of performing the treatment and/or the information may be sent to a transportation facility and include a request to transport the damaged vehicle to the treatment facility. In some embodiments, the mobile computing device 910 and/or on-board computing device 914 may display on the user interface 1002 an initial loss report screen including, for example, a cost estimate for treating the vehicle, for example, based on one or more treatment codes. The initial loss report screen may also include other treatment information such as the crash information, the vehicle type including make and model, the treatment complexity level, an estimated duration for repairing the vehicle, a list of treatment facilities capable of treating the vehicle and their respective availabilities, etc. The display may also include options allowing the user to select a treatment facility from the list of treatment facilities, transfer funds into the user's personal account, schedule a rental car, etc.

In embodiments where the mobile computing device 910 and/or on-board computing device 914 is a thin-client device, the server device 940 may perform many of the processing functions remotely that may otherwise be performed by system personnel and/or the mobile computing device 910 and/or on-board computing device 914. In such embodiments, the server device 940 may include a number of software applications capable of receiving vehicle operating information gathered by the sensors and/or acquiring collision data to be used in determining the extent of damage to the vehicle 908 involved in the crash. For example, the mobile computing device 910 and/or on-board computing device 914 may gather information from its sensors as described herein, but instead of using the information locally, the mobile computing device 910 and/or on-board computing device 914 may send the information to the server device 940 for remote processing. The server device 940 may perform the analysis of the gathered crash information to determine the amount of damage to the vehicle 908 as described herein. The server device 940 may then determine whether the damaged vehicle can be repaired or scrapped, and where the damaged vehicle may be taken for such treatment. The server device 940 may also transmit information associated with the treatment of the damaged vehicle. For example, the information transmitted by the server device 940 may be sent to a treatment facility and/or a transport facility and include a request to transport the damaged vehicle to the treatment facility, or the server device 940 may transmit the information to the mobile computing device 910 and/or on-board computing device 914.

FIGS. 8-11 depict application pages that may be presented on the user interface 1002 of the mobile computing device 910 as part of the user interface used to implement the vehicle treatment system 900. While FIGS. 8-11 depict pages or screens of information capable of being presented on the display 1002 of the mobile computing device 910, it is to be understood that the application pages or screens of information could be displayed on the display 1002 of the on-board computing device 914 in addition to being displayed on the mobile device 910 or as an alternative. In addition, the application pages may also be displayed on the user interface 963 of the server device 940. The applications or pages may be generated by the mobile computing device 910/914 or sent to the mobile computing device 910/914 by the server 940 (e.g., as with a thin client). The user may launch the application from the mobile computing device 910/914 via any suitable manner, such as touch-selecting a start application icon 1104 on the display 1002 of the mobile computing device 910/914 or speaking a voice command into the microphone (not shown) of the mobile computing device 910/914. After the user launches the application 1032, the application 1032 may begin to run on the mobile computing device 910/914 as described above in connection to block 202, FIG. 2; or the mobile computing device 910 may communicate with the on-board computing device 914 and the client application 1032 may begin to run on the on-board computing device 914.

Figures 8, 9:
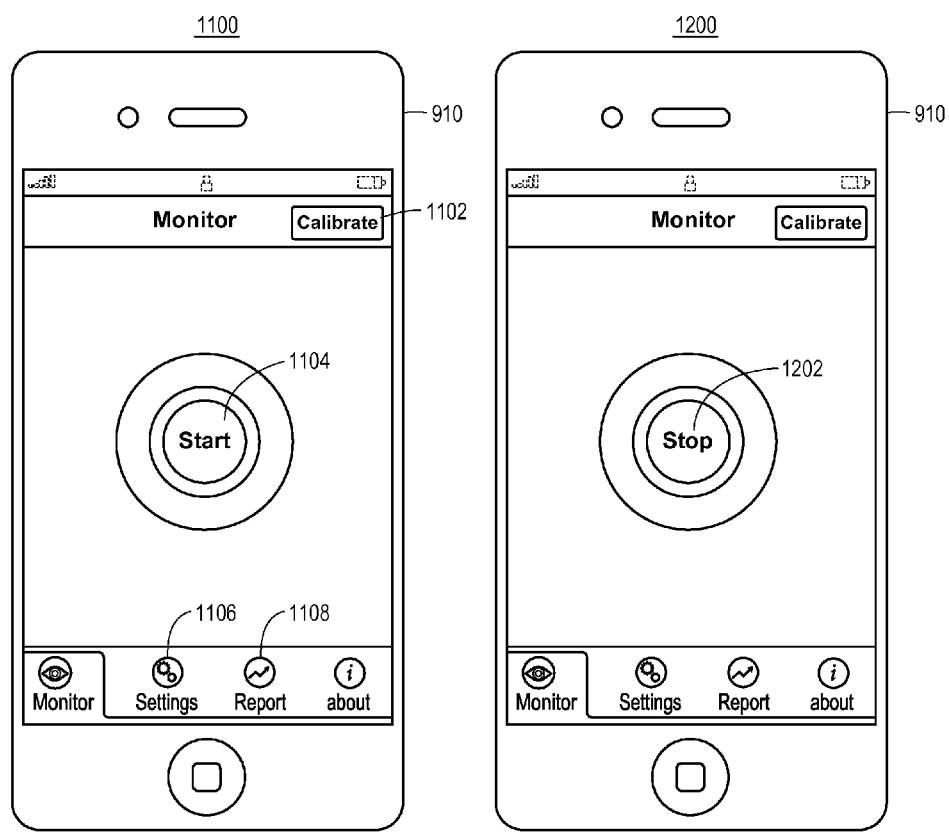
FIGS. 8-11 depict example embodiments of displayed information on the user interface of the computing device(s) in accordance with the presently described embodiments.

With reference now to FIG. 8, a monitor screen 1100 of the client application and/or routine may be displayed on the screen of the mobile computing device 910/914. The monitor screen 1100 may include a 'Calibrate" tab 1102, a "Start" tab 1104, a "Settings" tab 1106, and a 'Report' tab 1108. When the user selects the "Calibrate" tab 1102, the client application may execute a calibration routine. A calibration screen (not shown) may be displayed on the screen of the mobile computing device 910/914 during execution of the calibration routine, wherein the progress of the calibration routine may be indicated by an illustration showing the approximate status of the calibration routine. If desired, a user may cancel the calibration and/or set the calibration routine to run in the "background," so as not to appear on the screen 1100 of the mobile computing device 910/914.

When the user selects the "Start" tab 1104, the client application may begin to monitor and collect data about vehicle operation. The collected data may be stored as described above and/or additional data may be mathematically determined from the collected data about vehicle operation and also stored. Once started, a vehicle monitor screen 1200 shown in FIG. 9 may be displayed on the screen of the mobile computing device 910/914. The vehicle monitor screen 1200 may include a "Stop" tab 1202. If the "Stop" tab 1202 is selected by the user, the vehicle treatment system 900 will terminate vehicle operation monitoring. The vehicle treatment system 900 may also be stopped by a voice command of the user. Alternatively, the vehicle treatment system 900, e.g., gathering and analyzing of the vehicle operation and/or collision data, may be ceased by the mobile computing device 910/914 detecting that the engine of the vehicle 908 has stopped.

Figure 11:
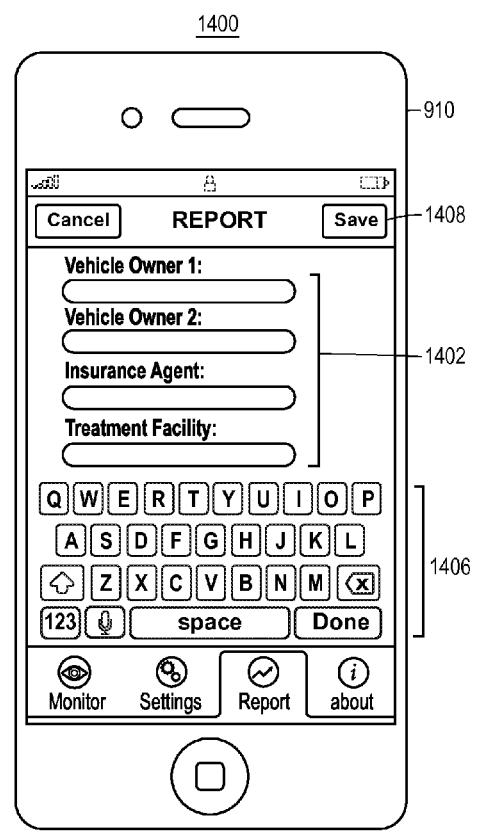

Referring now to FIG. 10, when the user selects the "Settings" tab 1106 shown in FIG. 11, a settings screen 1300 may be displayed on the screen of the mobile computing device 910/914. The settings screen 1300 may include a variety of information that the user or vehicle operator may enter into the vehicle treatment system 900 via a "soft" keyboard 1306 of the user interface of the mobile computing device 910/914. Such information may include the vehicle owner's name and/or contact information 1302. Additional information may include the make, model, and year of the vehicle type 1304 of the vehicle 908 that will be utilized with the treatment system 900. The settings screen 1300 may also include a variety of parameters that may be entered and adjusted by the user, such as the mode for turning on the treatment system 900, i.e., manual or automatic, etc. The parameters may be modified and saved by the user or vehicle operator via selection of a "Save" tab 1308 of the user interface on the mobile computing device 910/914.

Referring now to FIG. 11, when the user selects the "Report" tab 1108 shown in FIG. 11, a report screen 1400 may be displayed on the screen of the mobile device 910/914. The report screen 1400 may include a list of contacts 1402 to be notified in the event of a crash. The contact list 1402 may include the vehicle owner, insurance agent, etc., and may be entered and/or modified by the user via a "soft" keyboard 1406 of a user interface of the mobile computing device 910. The list of contacts 1402 may be saved by the user or vehicle operator via selection of the "Save" tab 1408 of the user interface of the mobile computing device 910.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Still further, for the purposes of illustration only, the figures depict preferred embodiments of a communication system and method for a mobile platform. One skilled in the art will readily recognize from the discussion above that alternative embodiments of the structures and methods illustrated herein may be employed without departing from the principles described herein.

Of course, the applications and benefits of the systems, methods, and techniques described herein are not limited to only the above examples. Many other applications and benefits are possible by using the systems, methods, and techniques described herein.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Moreover, although the preceding text sets forth a detailed description of numerous different embodiments, it should be understood that the legal scope of the invention is defined by the words of the claims set forth at the end of this patent. The detailed description is to be construed as example only and does not describe every possible embodiment, as describing every possible embodiment would be impractical, if not impossible. One could implement numerous alternate embodiments, using either current technology or technology developed after the filing date of this patent, which would still fall within the scope of the claims. By way of example, and not limitation, the disclosure herein contemplates at least the following aspects:

Aspect 1: A method implemented on a computer system for facilitating treatment of a vehicle damaged in a crash, the method comprising: receiving, by one or more processors, vehicle market information of a vehicle type that includes the damaged vehicle, the vehicle market information including a market value for the vehicle type, a vehicle part for the vehicle type that includes the damaged vehicle, and/or a prescribed vehicle treatment for the vehicle type that includes the damaged vehicle; incorporating, by the one or more processors, the received vehicle market information with vehicle collision data stored in a memory device; monitoring, by the one or more processors, the market value for the vehicle type, the vehicle part, and/or the prescribed vehicle treatment; detecting, by the one or more processors, a change in the monitored market value for the vehicle type, the vehicle part, and/or the prescribed vehicle treatment; modifying, via the one or more processors, the vehicle collision data with the detected change in the monitored value for the vehicle type, the vehicle part, and/or the prescribed vehicle treatment; receiving crash information about the damaged vehicle; determining a vehicle treatment complexity level associated with treating the damaged vehicle based on the received crash information and the modified vehicle collision data; selecting a vehicle treatment facility for treating the damaged vehicle based on the determined treatment complexity level; and transmitting information associated with treating the damaged vehicle.

Aspect 2: The method of aspect 1, wherein the monitoring of the market value for the vehicle type, the vehicle part, and/or the prescribed vehicle treatment includes periodically monitoring the market value for the vehicle type, the vehicle part, and/or the prescribed vehicle treatment, wherein the periodic monitoring includes a period of a minute, an hour, a day, or a week.

Aspect 3: The method of any one of aspects 1-2, wherein receiving crash information about a damaged vehicle includes receiving a description of the damaged vehicle, and wherein the received description includes an auditory description and/or a visual description.

Aspect 4: The method of any one of aspects 1-3, wherein the treatment complexity level further includes a price schedule for treating the damaged vehicle or a time duration for completing treatment of the damaged vehicle, wherein treating the damaged vehicle includes repairing, salvaging, or scrapping the damaged vehicle.

Aspect 5: The method of any one of aspects 1-4, wherein determining the treatment complexity level includes evaluating, via the one or more processors, the crash information of the damaged vehicle with the modified vehicle collision data of the vehicle type that includes the damaged vehicle.

Aspect 6: The method of any one of aspects 1-5, wherein determining the treatment complexity level includes analyzing the crash information of the damaged vehicle.

Aspect 7: A method implemented on a computer system for facilitating treatment of a vehicle damaged in a crash, the method executed by one or more processors programmed to perform the method, the method comprising: receiving, by one or more processors, vehicle market information of a vehicle type that includes the damaged vehicle, the vehicle market information including a market value for the vehicle type that includes the damaged vehicle, a vehicle part for the vehicle type that includes the damaged vehicle, and/or a prescribed vehicle treatment for the vehicle type that includes the damaged vehicle; incorporating, by the one or more processors, the received vehicle market information with vehicle collision data stored in a memory device, wherein the vehicle collision data includes a vehicle treatment code; monitoring, by the one or more processors, the market value for the vehicle type, the vehicle part, and/or the prescribed vehicle treatment; detecting, by the one or more processors, a change in the monitored market value for the vehicle type, the vehicle part, and/or the prescribed vehicle treatment; modifying, via the one or more processors, the vehicle treatment code to include the detected change in the monitored market value for the vehicle type, the vehicle part, and/or the prescribed vehicle treatment; receiving crash information about the damaged vehicle; determining a vehicle treatment complexity level associated with treating the damaged vehicle based on the received crash information and the modified vehicle treatment code; selecting a vehicle treatment facility for treating the damaged vehicle based on the determined treatment complexity level; and transmitting information associated with treating the damaged vehicle.

Aspect 8: The method of aspect 7, wherein the monitoring of the market value for the vehicle type, the vehicle part, and/or the prescribed vehicle treatment includes periodically monitoring the market value for the vehicle type, the vehicle part, and/or the prescribed vehicle treatment, wherein the periodic monitoring includes a period of a minute, an hour, a day, or a week.

Aspect 9: The method of any one of aspects 7-8, wherein receiving crash information about a damaged vehicle includes receiving a description of the damaged vehicle, and wherein the description of the damaged vehicle includes an auditory description and/or a visual description.

Aspect 10: The method of any one of aspects 7-9, wherein the modified vehicle treatment code includes a price schedule for the modified treatment code and/or a time duration for completing the modified treatment code, and wherein the treatment complexity level includes repairing, salvaging, or scrapping the damaged vehicle.

Aspect 11: The method of any one of aspects 7-10, wherein determining a treatment complexity level includes evaluating, via the one or more processors, the crash information of the damaged vehicle with at least one modified vehicle treatment code of the vehicle type that includes the damaged vehicle.

Aspect 12: The method of any one of aspects 7-11, wherein determining a treatment complexity level includes analyzing the crash information of the damaged vehicle.

Aspect 13: A computer system for facilitating treatment of a vehicle damaged in a crash, the computer system comprising: a computing device including one or more processors; and one or more memory devices coupled to the one or more processors of the computing device, the one or more memory devices storing executable instructions that when executed by the one or more processors of the computing device cause the computer system to: receive vehicle market information of a vehicle type that includes the damaged vehicle, the vehicle market information including a market value for the vehicle type, a vehicle part for the vehicle type that includes the damaged vehicle, and/or a prescribed vehicle treatment for the vehicle type that includes the damaged vehicle; incorporate the received vehicle market information with vehicle collision data stored in a memory device; monitor the market value for the vehicle type, the vehicle part, and/or the prescribed vehicle treatment; detect a change in the monitored market value for the vehicle type, the vehicle part, and/or the prescribed vehicle treatment; modify the vehicle collision data with the detected change in the monitored market value for the vehicle type, the vehicle part, and/or the prescribed vehicle treatment; receive crash information about the damaged vehicle; determine a vehicle treatment complexity level associated with treating the damaged vehicle based on the received crash information and the modified vehicle collision data; select a vehicle treatment facility for treating the damaged vehicle based on the determined treatment complexity level; and transmit information associated with treating the damaged vehicle.

Aspect 14: The computer system of aspect 13, wherein the information associated with treating the damaged vehicle includes information associated with transporting the damaged vehicle to a selected treatment facility, and wherein selection of the selected treatment facility is based on the treatment complexity level.

Aspect 15: The computer system of any one of aspects 13-14, further comprising: an analyzer operatively coupled to the one or more processors and evaluating the crash information of the damaged vehicle with the vehicle collision data of a vehicle type that includes the damaged vehicle.

Aspect 16: The computer system of any one of aspects 13-15, wherein the vehicle collision data includes a particular treatment complexity level equated to a particular collision data.

Aspect 17: The computer system of any one of aspects 13-16, further comprising: one or more sensors coupled to the one or more processors to monitor operating information of the damaged vehicle and facilitate gathering crash information of the damaged vehicle and/or providing crash information of the damaged vehicle to the computing device.

Aspect 18: A tangible, computer-readable medium storing instructions that when executed by one or more processors of a computer system cause the computer system to: receive vehicle market information of a vehicle type that includes the damaged vehicle, the vehicle market information including a market value for the vehicle type, a vehicle part for the vehicle type that includes the damaged vehicle, and/or a prescribed vehicle treatment for the vehicle type that includes the damaged vehicle; incorporate the received vehicle market information with vehicle collision data stored in a memory device; monitor the market value for the vehicle type, the vehicle part, and/or the prescribed vehicle treatment; detect a change in the monitored market value for the vehicle type, the vehicle part, and/or the prescribed vehicle treatment; modify the vehicle collision data with the detected change in the monitored market value for the vehicle type, the vehicle part, and/or the prescribed vehicle treatment; receive crash information about the damaged vehicle; determine a vehicle treatment complexity level associated with treating the damaged vehicle based on the received crash information and the modified vehicle collision data; select a vehicle treatment facility for treating the damaged vehicle based on the determined treatment complexity level; and transmit information associated with treating the damaged vehicle.

Aspect 19: The tangible, computer-readable medium of aspect 18, wherein the information associated with treating the damaged vehicle includes information associated with transporting the damaged vehicle to a selected treatment facility, and wherein selection of the selected treatment facility is based on the treatment complexity level.

Aspect 20: The tangible, computer-readable medium of any one of aspects 18-19, wherein the vehicle collision data includes a particular treatment complexity level equated to a particular collision data.

What is claimed:

1. A method implemented on a computer system for facilitating treatment of a vehicle damaged in a crash, the method comprising:
   receiving, by one or more processors, vehicle market information of a vehicle type that includes the damaged vehicle, the vehicle market information including a market value for the vehicle type, a vehicle part for the vehicle type that includes the damaged vehicle, and/or a prescribed vehicle treatment for the vehicle type that includes the damaged vehicle;
   incorporating, by the one or more processors, the received vehicle market information with vehicle collision data of the vehicle type that includes the damaged vehicle stored in a memory device;
   monitoring, by the one or more processors, the market value for the vehicle type, the vehicle part, and/or the prescribed vehicle treatment;
   detecting, by the one or more processors, a change in the monitored market value for the vehicle type, the vehicle part, and/or the prescribed vehicle treatment;
   modifying, by the one or more processors, the vehicle collision data with the detected change in the monitored market value for the vehicle type, the vehicle part, and/or the prescribed vehicle treatment;
   receiving, by the one or more processors via one or more sensors coupled to the vehicle, crash information about the damaged vehicle, the crash information including vehicle operating data of the damaged vehicle near or at the time of the crash including acceleration data from an accelerometer disposed within the damaged vehicle, and vehicle direction data from a positioning device disposed within the damaged vehicle;
   evaluating the received crash information with the modified vehicle collision data;
   determining, by the one or more processors, a vehicle treatment complexity level associated with treating the damaged vehicle based on the evaluation of the received crash information and the modified vehicle collision data;
   selecting, by the one or more processors, a vehicle treatment facility for treating the damaged vehicle based on the determined treatment complexity level; and
   transmitting, by the one or more processors, information associated with treating the damaged vehicle.

2. The method of claim 1, wherein the monitoring of the market value for the vehicle type, the vehicle part, and/or the prescribed vehicle treatment includes periodically monitoring the market value for the vehicle type, the vehicle part, and/or the prescribed vehicle treatment, wherein the periodic monitoring includes a period of a minute, an hour, a day, or a week.

3. The method of claim 1, wherein receiving crash information about a damaged vehicle includes receiving a description of the damaged vehicle, and wherein the received description includes an auditory description and/or a visual description.

4. The method of claim 1, wherein the treatment complexity level further includes a price schedule for treating the damaged vehicle and/or a time duration for completing treatment of the damaged vehicle, wherein treating the damaged vehicle includes repairing, salvaging, or scrapping the damaged vehicle.

5. The method of claim 1, wherein determining the treatment complexity level includes evaluating, via the one or more processors, the crash information of the damaged vehicle with the modified vehicle collision data of the vehicle type that includes the damaged vehicle.

6. The method of claim 1, wherein determining the treatment complexity level includes analyzing the crash information of the damaged vehicle.

7. A method implemented on a computer system for facilitating treatment of a vehicle damaged in a crash, the method executed by one or more processors programmed to perform the method, the method comprising:

receiving, by one or more processors, vehicle market information of a vehicle type that includes the damaged vehicle, the vehicle market information including a market value for the vehicle type that includes the damaged vehicle, a vehicle part for the vehicle type that includes the damaged vehicle, and/or a prescribed vehicle treatment for the vehicle type that includes the damaged vehicle;

incorporating, by the one or more processors, the received vehicle market information with vehicle collision data of the vehicle type that includes the damaged vehicle stored in a memory device, wherein the vehicle collision data includes a vehicle treatment code;

monitoring, by the one or more processors, the market value for the vehicle type, the vehicle part, and/or the prescribed vehicle treatment;

detecting, by the one or more processors, a change in the monitored market value for the vehicle type, the vehicle part, and/or the prescribed vehicle treatment;

modifying, by the one or more processors, the vehicle treatment code to include the detected change in the monitored market value for the vehicle type, the vehicle part, and/or the prescribed vehicle treatment;

receiving, by the one or more processors via one or more sensors coupled to the vehicle, crash information about the damaged vehicle, the crash information including vehicle operating data of the damaged vehicle near or at the time of the crash including acceleration data from an accelerometer disposed within the damaged vehicle, and vehicle direction data from a positioning device disposed within the damaged vehicle;

evaluating the received crash information with the modified vehicle treatment code;

determining, by the one or more processors, a vehicle treatment complexity level associated with treating the damaged vehicle based on the evaluation of the received crash information and the modified vehicle treatment code;

selecting, by the one or more processors, a vehicle treatment facility for treating the damaged vehicle based on the determined treatment complexity level; and transmitting, by the one or more processors, information associated with treating the damaged vehicle.

8. The method of claim 7, wherein the monitoring of the market value for the vehicle type, the vehicle part, and/or the prescribed vehicle treatment includes periodically monitoring the market value for the vehicle type, the vehicle part, and/or the prescribed vehicle treatment, wherein the periodic monitoring includes a period of a minute, an hour, a day, or a week.

9. The method of claim 7, wherein receiving crash information about a damaged vehicle includes receiving a description of the damaged vehicle, and wherein the description of the damaged vehicle includes an auditory description and/or a visual description.

10. The method of claim 7, wherein the modified vehicle treatment code includes a price schedule for the modified treatment code and/or a time duration for completing the modified treatment code, and wherein the treatment complexity level includes repairing, salvaging, or scrapping the damaged vehicle.

11. The method of claim 7, wherein determining a treatment complexity level includes evaluating, by the one or more processors, the crash information of the damaged vehicle with at least one modified vehicle treatment code of the vehicle type that includes the damaged vehicle.

12. The method of claim 7, wherein determining a treatment complexity level includes analyzing the crash information of the damaged vehicle.

13. A computer system for facilitating treatment of a vehicle damaged in a crash, the computer system comprising:

a computing device including one or more processors;

one or more sensors coupled to the vehicle and the one or more processors of the computing device; and one or more memory devices coupled to the one or more processors of the computing device, the one or more memory devices storing executable instructions that when executed by the one or more processors of the computing device cause the computer system to:

receive vehicle market information of a vehicle type that includes the damaged vehicle, the vehicle market information including a market value for the vehicle type, a vehicle part for the vehicle type that includes the damaged vehicle, and/or a prescribed vehicle treatment for the vehicle type that includes the damaged vehicle;

incorporate the received vehicle market information with vehicle collision data of the vehicle type that includes the damaged vehicle stored in a memory device;

monitor the market value for the vehicle type, the vehicle part, and/or the prescribed vehicle treatment;

detect a change in the monitored market value for the vehicle type, the vehicle part, and/or the prescribed vehicle treatment;

modify the vehicle collision data with the detected change in the monitored market value for the vehicle type, the vehicle part, and/or the prescribed vehicle treatment;

receive, by the one or more processors via the one or more sensors, crash information about the damaged vehicle, the crash information including vehicle operating data of the damaged vehicle near or at the time of the crash including acceleration data from an accelerometer disposed within the damaged vehicle, and vehicle direction data from a positioning device disposed within the damaged vehicle;

evaluate the received crash information with the modified vehicle collision data;

determine a vehicle treatment complexity level associated with treating the damaged vehicle based on the evaluation of the received crash information and the modified vehicle collision data;

select a vehicle treatment facility for treating the damaged vehicle based on the determined treatment complexity level; and transmit information associated with treating the damaged vehicle.

14. The computer system of claim 13, wherein the information associated with treating the damaged vehicle includes information associated with transporting the damaged vehicle to a selected treatment facility, and wherein selection of the selected treatment facility is based on the treatment complexity level.

15. The computer system of claim 13, further comprising:
an analyzer operatively coupled to the one or more processors and evaluating the vehicle operating data of the damaged vehicle with the vehicle collision data of a vehicle type that includes the damaged vehicle.

16. The computer system of claim 13, wherein the vehicle collision data includes a particular treatment complexity level equated to a particular collision data.

17. A tangible, non-transitory, computer-readable medium storing instructions that when executed by one or more processors of a computer system cause the computer system to:
receive vehicle market information of a vehicle type that includes the damaged vehicle, the vehicle market information including a market value for the vehicle type, a vehicle part for the vehicle type that includes the damaged vehicle, and/or a prescribed vehicle treatment for the vehicle type that includes the damaged vehicle;
incorporate the received vehicle market information with vehicle collision data of the vehicle type that includes the damaged vehicle stored in a memory device;
monitor the market value for the vehicle type, the vehicle part, and/or the prescribed vehicle treatment;
detect a change in the monitored market value for the vehicle type, the vehicle part, and/or the prescribed vehicle treatment;
modify the vehicle collision data with the detected change in the monitored market value for the vehicle type, the vehicle part, and/or the prescribed vehicle treatment;
receive, by one or more sensors coupled to the vehicle, crash information about the damaged vehicle, the crash information including vehicle operating data of the damaged vehicle near or at the time of the crash including acceleration data from an accelerometer disposed within the damaged vehicle, and vehicle direction data from a positioning device disposed within the damaged vehicle;
evaluate the received crash information with the modified vehicle collision data;
determine a vehicle treatment complexity level associated with treating the damaged vehicle based on the evaluation of the received crash information and the modified vehicle collision data;
select a vehicle treatment facility for treating the damaged vehicle based on the determined treatment complexity level; and
transmit information associated with treating the damaged vehicle.

18. The tangible, non-transitory, computer-readable medium of claim 17, wherein the information associated with treating the damaged vehicle includes information associated with transporting the damaged vehicle to a selected treatment facility, and wherein selection of the selected treatment facility is based on the treatment complexity level.

19. The tangible, non-transitory, computer-readable medium of claim 17, wherein the vehicle collision data includes a particular treatment complexity level equated to a particular collision data.

* * * * *